United States Patent
Cano et al.

(10) Patent No.: US 12,436,322 B2
(45) Date of Patent: Oct. 7, 2025

(54) OPTICAL ELEMENT COMPRISING AT LEAST ONE HOLOGRAPHIC DIFFUSIVE ELEMENT

(71) Applicant: Essilor International, Charenton-le-Pont (FR)

(72) Inventors: Jean-Paul Cano, Charenton-le-Pont (FR); Aude Bouchier, Charenton-le-Pont (FR); Gilles Le Saux, Paris (FR)

(73) Assignee: Essilor International, Charenton-le-Pont (FR)

( * ) Notice: Subject to any disclaimer, the term of this patent is extended or adjusted under 35 U.S.C. 154(b) by 410 days.

(21) Appl. No.: 18/040,070

(22) PCT Filed: Aug. 3, 2021

(86) PCT No.: PCT/EP2021/071677
§ 371 (c)(1),
(2) Date: Jan. 31, 2023

(87) PCT Pub. No.: WO2022/033929
PCT Pub. Date: Feb. 17, 2022

(65) Prior Publication Data
US 2023/0273352 A1  Aug. 31, 2023

(30) Foreign Application Priority Data
Aug. 10, 2020  (EP) ..................... 20305920

(51) Int. Cl.
*G02B 5/00* (2006.01)
*G02B 5/02* (2006.01)
*G02C 7/02* (2006.01)

(52) U.S. Cl.
CPC ......... *G02B 5/0252* (2013.01); *G02B 5/0284* (2013.01); *G02C 7/022* (2013.01); *G02C 2202/24* (2013.01)

(58) Field of Classification Search
CPC .... G02B 5/0252; G02B 5/0284; G02C 7/022; G02C 2202/24
(Continued)

(56) References Cited
U.S. PATENT DOCUMENTS

| 6,476,942 B1 | 11/2002 | Kodama et al. |
| 10,302,962 B2 | 5/2019 | Neitz et al. |

(Continued)

FOREIGN PATENT DOCUMENTS

| CN | 106716227 | 5/2017 |
| WO | WO 2016/156614 A1 | 10/2016 |

OTHER PUBLICATIONS

International Search Report and Written Opinion mailed on Oct. 19, 2021 in PCT/EP2021/071677 filed on Aug. 3, 2021, 11 pages.

*Primary Examiner* — Daniel A Hess
(74) *Attorney, Agent, or Firm* — Oblon, McClelland, Maier &Neustadt, L.L.P.

(57) ABSTRACT

An optical element is configured to be worn in front of an eye of a wearer. The optical element has two main surfaces and includes at least one holographic diffusive element having diffusive properties resulting from spatial variations of refractive index of said holographic diffusive element. The spatial variation of refractive index is greater than 0.001 at at least one given wavelength, on a distance less than 30 μm. An optical equipment includes the optical element and methods for recording a holographic medium onto an optical lens.

15 Claims, 11 Drawing Sheets

(58) Field of Classification Search
USPC .............................................................. 359/1
See application file for complete search history.

(56) References Cited

U.S. PATENT DOCUMENTS

| | | |
|---|---|---|
| 2017/0075139 A1 | 3/2017 | Sessner et al. |
| 2019/0033619 A1* | 1/2019 | Neitz ........................ G02C 7/16 |
| 2019/0219968 A1 | 7/2019 | Bouchier et al. |
| 2019/0235279 A1* | 8/2019 | Hones ....................... G02C 7/10 |
| 2021/0282966 A1* | 9/2021 | Back ........................ G02C 7/027 |
| 2022/0035179 A1* | 2/2022 | Rappon .................. G02C 7/061 |
| 2023/0258958 A1* | 8/2023 | Esfandiarijahromi ....................... G02C 7/061 351/159.01 |

* cited by examiner

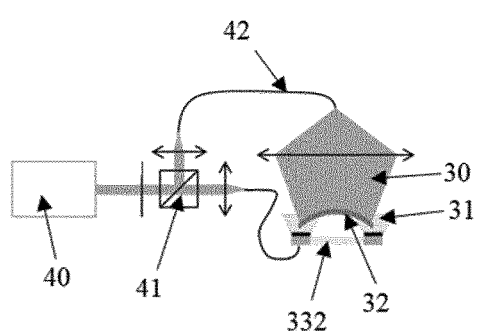 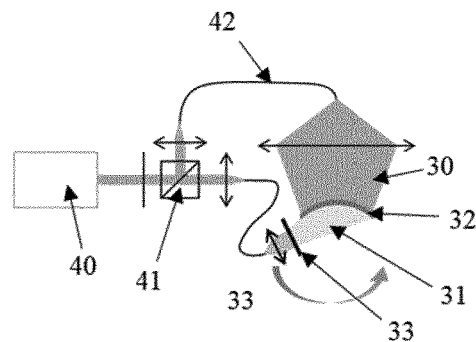
FIG.17E    FIG.17F
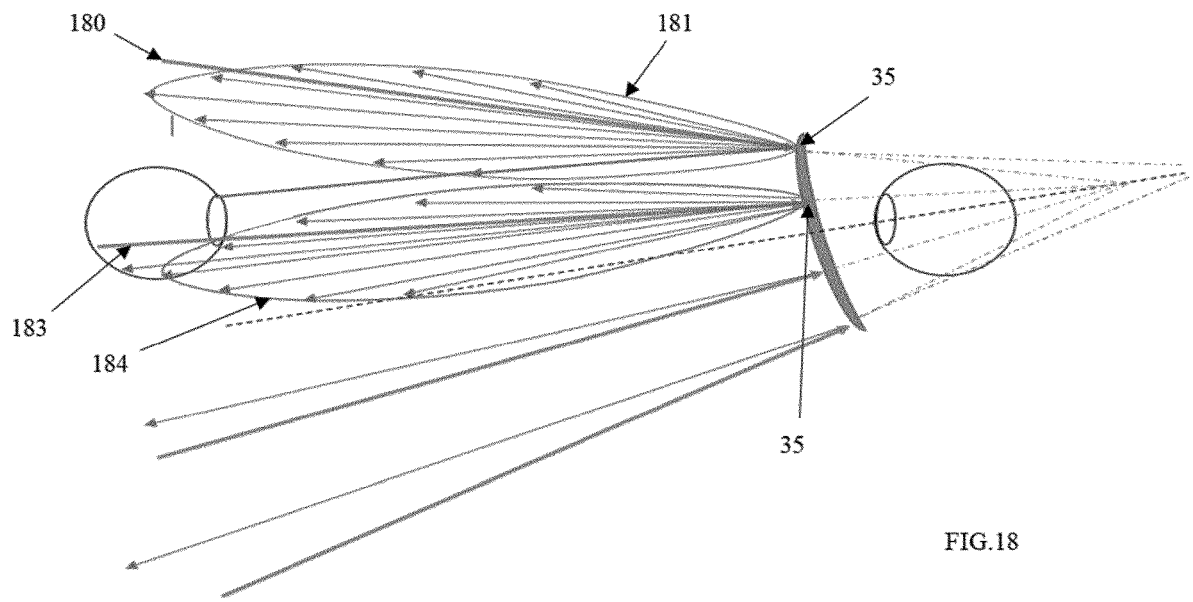
FIG.18

OPTICAL ELEMENT COMPRISING AT LEAST ONE HOLOGRAPHIC DIFFUSIVE ELEMENT

FIELD OF THE INVENTION

The present invention belongs to the field of optics, in particular the ophthalmic field.

The present invention is related to optical elements comprising at least one holographic diffusive element as well as methods for manufacturing such optical elements.

BACKGROUND OF THE INVENTION

A very important criterion for optical lens intended to be worn in front of an eye of a wearer is an aestheticism criterion such as a good-looking lens. However the challenge is to manage to maintain a high level of comfort, correction and therapeutic effect with this aestheticism criterion.

For example, some recently developed optical lenses comprise, on one of their main surfaces, diffusive elements which are protrusions on the surface of the optical lens. Such diffusive elements are obtained either by photolithography or by depositing discrete portions of a material comprising the protrusions and by curing the deposited material.

Such optical lenses allow diffusing part of incoming visible light, both in reflection and in transmission. Therefore, when such known optical lenses are worn, at least part of the incoming visible light is not focused on the retina of the wearer, which allows slowing down a progression of an abnormal refraction of the eye.

One of the drawbacks of this kind of diffusive element is the roughness of the lens which clearly decreases the level of aestheticism criteria.

The diffusive elements may create a non-focused beam of light, which width is minimal in a designated plane in front of the retina of the wearer. A blurred image is thus projected on the designated plane.

Both of the above approaches have been successfully applied as myopia control solutions through optical actions.

Recent controlled clinical trials have provided evidence of the benefits of an array of mechanically-formed diffusive elements in the peripheral visual field to slow down myopia progression. The purpose of this array of diffusive elements is to provide, through a slight diffusion, an optical blurred image in front of the retina, triggering a stop signal to the eyes growth. The central area of the lenses is free of diffusive elements, to enable a good vision. The basic principle of this solution is to decrease the contrast of the eye elongation signal in the peripheral visual field.

So, all existing versions of myopia control products based on optical peripheral technologies have to manage a trade-off between improving the efficiency of myopia control and degrading the visual performances for the wearer in off-center viewing conditions.

More generally, in all known optical lenses with diffusive elements, such diffusive elements have drawbacks including:
parasite diffusion or stray light,
loss of contrast and
surface roughness, which may be detrimental to the mechanical resistance of the optical lens.

For another example where the aestheticism criterion is very important, a concern in the field of optics is to provide sunglasses or lightly colored lenses where the color in transmission as seen by the wearer would be different than the one seen by observers on the outside. That would allow providing specific looks that are fashionable or, on the contrary, hiding colors or filters in order to keep a high level of the aestheticism criteria, some wearers wish to have lens with a particular reflected color which can be observed by any person placed in front of him.

There is therefore a general need for optical elements diffusing incoming light without the drawbacks exhibited by known diffusive elements.

There is a further specific need for optical elements being effective for slowing down myopia progression without the drawbacks exhibited by known diffusive elements.

SUMMARY OF THE INVENTION

The invention is defined by the appended independent claims. Additional features and advantages of the concepts herein disclosed are set forth in the description which follows.

The present disclosure aims at improving the situation. In particular, one aim of the invention is to overcome the above mentioned drawbacks.

To this end, the present disclosure describes an optical element intended to be worn in front of an eye of a wearer, the optical element comprises at least one holographic diffusive element having diffusive properties resulting from spatial variations of refractive index of said holographic diffusive element, said spatial variation of refractive index being greater than 0.001 at at least one given wavelength, on a distance less than 30 µm.

Holographic diffusive elements are well-known, as defined for example in the article "Holographic diffusers" by Stephen Wadle, Daniel Wuest, John Cantalupo, and Roderic S. Lakes in Optical Engineering 33(1), (1 Jan. 1994).

There are generally three scattering regimes, depending on the characteristic size of the scattering elements in relation to the wavelength considered:
the specular regime—the scattering elements are large compared to the wavelength of the radiation. The physics adapted to this scale is geometric optics. The word specular designates the direction in which the light is reflected according to the laws of Snell-Descartes,
the Thomson or Rayleigh scattering regime—the scattering elements are small compared to the wavelength,
the intermediate regime—the size of the scattering elements is of the order of magnitude of the wavelength.

In a diffraction network, scattering elements which size qualifies for the intermediate regime are periodically arranged according to a regular lattice. The resulting wavefront superposition forms resonant scattering.

In the holographic diffusive elements considered throughout this document, the repartition of the scattering elements is random, according to an irregular, or aperiodic, lattice. In other words, holographic diffusive elements lack a long-range structural order. Holographic diffusive materials lack the long-range order characteristics of a crystalline solid, in terms of optical properties of the material relatively to the relevant wavelength. As a result, although limited Bragg effects may appear, since any random repartition of structural elements may be seen as an ensemble of Bragg planes of different spacings and orientations, the holographic diffusive elements considered throughout this document do not exhibit strictly resonant scattering, but exhibit on the contrary mostly diffuse scattering.

The optical element allows selectively scattering incoming optical light towards a predetermined direction, such as part of the eye of the wearer when the optical element is worn, thanks to the specifically configured holographic diffusive element and, more particularly thanks to the spatial variations of refractive index of the holographic diffusive element.

The spatial variations of the refractive index are greater than 0.001 at at least one given wavelength, on a distance less than 30 µm, preferably less than 20 µm. The spatial variations of the refractive index may reach for example 0.05 or less over a distance less than 30 µm around a mean value about equal to 1.5. These spatial variations may be measured unequivocally, for example thanks to well-known interferential measurements with which, for the holographic diffusive element as disclosed in the present description, a dimension of interference fringes less than 30 µm, preferably less than 20 µm may be measured.

The thickness of the at least one holographic element may be less than 100 µm, preferably, between 10 µm and 50 µm.

The at least one given wavelength may be in the infrared range, for example between 2 µm and 5 µm, or in the UV range, or in the visible range, preferably in the visible range, for example between 350 nm and 750 nm.

To scatter light with a small angle of diffusion such as 2 degrees, 5 degrees or the like, the spatial variations of refractive index may be limited to 0.01 or 0.02. To scatter light with a larger angle of diffusion such as 25 degrees, 30 degrees or the like, greater spatial variations of refractive index may be allowed.

In the present disclosure, the term "diffusing" is equivalent to "scattering".

In the present disclosure, the main surfaces of the optical element are eyeball side surface (also referred to as the back surface) and object side surface (also referred to as the front surface). The eyeball side surface is positioned on the side of the optical element closest to a wearer's eye and the front surface is positioned on the opposite side of the optical element when the optical element is worn in front of the eye of the wearer.

Moreover, unlike protrusions as described in the prior art, which intrinsically lead to high areal roughness, the roughness of the main surfaces of the claimed optical element is unaffected by the presence of the holographic diffusive element.

Thus, each main surface of the optical element as described in the present disclosure, may have a roughness parameter uniformly smaller than 0.5 µm.

Optionally, the at least one holographic diffusive element has a diffusion efficiency between 5 and 50% at the at least one given wavelength within a predetermined range, for example between 5% and 40%, for example between 5% and 30%, for example between 5% and 20%. Such range of diffusion efficiency is interesting when an aim of the optical element is to influence a visual perception of a scene by the wearer, for example in order to control evolution of myopia.

Optionally, the at least one holographic diffusive element has a diffusion efficiency between 1 and 5% at the at least one given wavelength within a predetermined range. Such range of diffusion efficiency is interesting when an aim of the optical element is mainly, or solely, influencing a visual perception of the optical element by an observer, such as an interlocutor of the wearer.

The diffusion efficiency means the haze obtained through the at least one holographic diffusive element. It may be measured for example with a haze meter. Keeping diffusion efficiency below 50% allows to predominantly provide a clear, or sharp, vision to the wearer, along with a low and controlled level of blur.

Optionally, the spatial variations of refractive index may be configured such that: for at least one angular direction of incidence, when the optical element is exposed to a source beam of light originating from said angular direction of incidence, the source beam of light is scattered by at least one holographic diffusive element, forming at least one beam of scattered light, each said beam of scattered light being centered on a respective central angular direction, defined as an angular direction exhibiting a maximum luminance value, and each said beam of scattered light exhibiting a respective angle of diffusion, defined as a full width at half maximum of luminance, which has a wanted value comprised between 2° and 40°. Such range of angle of diffusion is interesting when an aim of the optical element is to influence a perception of a scene by the wearer, for example in order to control evolution of myopia. Indeed, in such a case, the beam of scattered light illuminates at least part of the pupil of the wearer. Such range is especially suitable if the optical element is a spectacle lens, considering the usual wearing distance between an optical element such as a spectacle lens and the eye of the wearer.

In the context of the disclosure, the source beam of light may refer to light in the environment of the wearer in various common situations. Examples include diffuse solar radiation. Examples further include artificial light emitted by various sources, for example by display screens. The source beam of light may also refer to a specifically shaped beam of light, emitted by a specific source arranged in a specific angular direction of incidence, for the purpose of being scattered by the holographic diffusive element.

Optionally, the optical element being worn in front of the eye of the wearer, at least one respective central angular direction may correspond to a direction towards a pupil of the eye or for example a retina of the eye or for example an eye rotation center of the eye.

Optionally, the optical element being worn in front of the eye of the wearer, at least one respective central angular direction may correspond to an opposite direction of the direction towards a pupil of the eye or for example a retina of the eye or for example an eye rotation center of the eye.

In some exemplary embodiments, a respective central angular direction corresponds to the direction where the center of the pupil of the eye of the wearer or the eye rotation center of the eye is intended to be when the optical element is worn.

In such embodiments, the extreme wanted values of each respective angle of diffusion (2° and 40°) are suitable to allow the beam of scattered light to illuminate, respectively, a target portion of an entrance pupil of the eye of the wearer and the whole entrance pupil of the eye of the wearer. Such central angular direction is suitable for the aim of influencing, through the holographic diffusive element, a perception of a scene by the wearer.

"Illuminating" an object is understood, throughout this document, as directing the scattered beam of light, defined as being radially delimited by the angle of diffusion, towards said object.

The wanted value of each respective angle of diffusion may be further customized in the 2°-40° range based on parameters related to the wearer and/or to a spectacle frame. Examples of parameters related to the wearer include prescription and pupil size. Examples of parameters related to both the wearer and the spectacle frame include vertex distance, pantoscopic angle and wrap angle.

The "at least one angular direction of incidence" may correspond for example to near vision of the wearer, or to far vision of the wearer. In other words, the optical element may be configured such that, in given wearing conditions, in terms of vertex distance, pantoscopic angle and wrap angle, such as usual wearing conditions known to the person ordinary skilled in the art or such as wearing conditions specific to a given wearer, the "at least one angular direction of incidence" corresponds to a gaze angle associated to a near, or respectively far, viewing distance.

Optionally, the optical element is worn in front of said eye and the at least one holographic diffusive element has an optical function of scattering light to illuminate a pupil or preferably a retina of said eye so as to slow down a progression of an abnormal refraction of the eye.

The optical element may have an optical function of scattering light to illuminate a foveal zone of a retina of said eye so as to slow down a progression of an abnormal refraction of the eye.

For example, the holographic diffusive element may have an optical function of scattering light to create a diffuse image of the source of light, located in front of the retina of the eye of the wearer.

Optionally, the optical function of the holographic diffusive element may also allow illuminating a peripheral zone of the retina of the eye of the wearer.

Optionally, the at least one angular direction of incidence corresponds to the near vision of the wearer. By near vision, we mean distances and/or angles for tasks such as reading, using computer or phone or hand manipulation tasks or any tasks that need to be closed to the wear.

According to one or several embodiments, the optical element may be a progressive optical lens comprising a near vision zone, an intermediate vision zone and a far vision zone. Alternatively, the optical element may be single vision with a unique focal distance.

Optionally, this example of a progressive optical lens may be associated to a subrange of wanted value of the angle of diffusion, such as from 15° to 40°. Therefore, in near vision, a wide area of the retina of the wearer is illuminated by scattered light. The wearer needs to accommodate in order to compensate for the scattering occurring in near vision activities, thus slowing down progression of presbyopia.

Therefore, it is possible for the holographic element to be configured so as to only scatter light incoming from some specific angular directions of incidence corresponding to specific types of visual activities.

The holographic element may also be configured, for example, for transmitting light incoming from any other angular direction of incidence without inducing any scattering.

As a result, it is possible for example to slow down myopia whenever the wearer is looking at objects at a far distance by scattering light coming from said objects, while not perturbing the wearer during near vision activities such as reading, by transmitting light from objects located at a near distance without scattering. As such, the holographic element may be configured, for example, for scattering light coming from an angular direction of incidence associated to far distance vision and for transmitting light coming from an angular direction of incidence associated to near distance vision without scattering.

Optionally, at least one holographic diffusive element may be diffusive only to light having a wavelength within a predetermined range.

Such range may for example cover the whole visible light spectrum, meaning about 400 nm or more wide. Alternatively, such range may cover a narrow spectrum, meaning less than 10 nm wide, for example about 5 nm or less wide.

For example, the at least one holographic diffusive element has a diffusion efficiency, the diffusion efficiency being maximal for the at least one given wavelength within a predetermined range.

It is thus possible to propose a holographic diffuser that is efficient for the at least three wavelengths corresponding to RGB light coming from a display, for example such as a screen of a smartphone. The holographic diffusive element may scatter, specifically, green light towards a target area of the eye of the wearer, with equivalent results on slowing down a progression of a refractive error of the eye.

Thus it makes it possible to maximize the signal ratio useful for slowing myopia/total diffusion, and thus provide an aestheticism/improved comfort vs. a classic diffusion.

For example, the holographic diffusive element may be recorded using coherent blue light.

Blue light emitted by display screens is known to be harmful over time to the retina, therefore, it may be interesting to scatter part of the emitted blue light in order to spread its effects apart from a single area of the retina.

Optionally the optical element may further comprise a light guide configured to guide the source beam of light towards the holographic diffusive element.

A purpose of the light guide is to control and direct the source beam of light towards the holographic diffusive element, in order to avoid parasite reflections or unwanted absorption and in order to provide a higher amount of light towards the central angular direction as if no light guide was present.

Optionally, the wanted value of the angle of diffusion may be greater than, respectively, 5°, 8°, 10°, 12°, or 15°.

Optionally, the wanted value of the angle of diffusion may be smaller than, respectively, 35°, 30°, 25°, 23°, or 20°.

The value of the angle of diffusion is related to the size of the area which is to be targeted by the beam of scattered light and to the distance between said area and the holographic diffusive element.

For example, an area to be illuminated using a given holographic diffusive element may correspond to a known position with respect to the holographic diffusive element. In such cases, the holographic diffusive element may for example be located on a peripheral portion of the optical element. By positioning the holographic diffusive element in a peripheral region of the optical element, the source beam of light which is scattered and directed by the holographic diffusive element is a beam of light which would been transmitted by the optical element towards the eye of the wearer, even if the holographic diffusive element is not in the center of the optical element. At the same time, the central portion of the optical element may be used for transmitting incoming light, from a scene, towards the eye of the wearer.

In another example, an area to be illuminated using a given holographic diffusive element may be part of the retina of an eye of the wearer through the pupil, or may encompass the whole pupil of an eye of the wearer.

Angles of diffusion between 2° and 12° may allow for example illuminating only a specific portion of the retina of the wearer, the portion having a predetermined size.

Assuming usual vertex distances of about 10 to 15 mm and pupil sizes of about 4 to 8 mm, angles of diffusion between 12° and 20° may allow for example illuminating an area corresponding to the whole pupil of the wearer.

Angles of diffusion above 20° may allow for example scattering light to illuminate, on purpose, an angular area larger than the pupil of the wearer.

Optionally, the holographic diffusive element may be configured so that a refractive power based on a prescription for the eye of the wearer is provided.

Ophthalmic lenses are optical elements comprising two opposite main surfaces, and providing a refractive power related to the shape of at least one of the two main surfaces.

For example, one main surface may be spherical, while the opposite main surface may be aspherical, more specifically shaped so as to provide a refractive power based on the prescription. As a result, the dioptric function of the optical element may be equal to the dioptric function of the aspherical main surface.

For example, both main surfaces may each be aspherical and may each contribute to providing a refractive power based on the prescription. As a result, the dioptric function of the optical element may be equal to the combination of the dioptric functions of both aspherical main surfaces.

For example, the holographic diffusive element, being located in between both main surfaces, may itself exhibit a refractive power. As a result, the dioptric function of the optical element may be equal to the combination of the dioptric functions of the holographic diffusive element and of at least one aspherical main surface.

By having the holographic diffusive element contribute to providing a refractive power based on a prescription for the eye of the wearer, a higher flexibility is allowed regarding the curvatures of the main surfaces. Such higher flexibility may be beneficial for example when seeking to optimize the weight or the weight distribution of the optical element.

The holographic diffusive element may be disposed on the eyeball side and/or on the object side and/or between the two main surfaces. Preferably, the at least holographic diffusive element is disposed on the eyeball side surface. The at least one holographic diffusive element may extend over only part of one of the two main surfaces or over the entirety of one of the two main surfaces.

Optionally, the optical lens comprises a plurality of such holographic diffusive elements. These at least two holographic diffusive elements may be disposed either at the same or at different areas on at least one of the two main surfaces.

Optionally, the at least two holographic diffusive elements may extend respectively over non-overlapping areas of the same main surface.

The arrangement of the at least two holographic diffusive elements may either follow a regular pattern or, on the contrary, be random, or irregular.

Optionally, the optical element may comprise a layer of optical material extending over at least part of one of the main surfaces, and the at least one holographic diffusive element may be formed in such a layer.

For example, a main surface of the substrate may be initially covered, at least partly, with a layer of photosensitive material suitable for recording the at least one holographic diffusive element. Then, the at least one holographic diffusive element may be recorded on at least part of the layer. Finally, the resulting optical element, comprising the at least one holographic diffusive element, may be treated so that the layer of photosensitive material loses its photosensitive optical properties.

Optionally, the optical element may be an optical lens, for instance a spectacle lens.

Of course, the holographic diffusive element is not restricted to be incorporated in a spectacle lens. A contact lens would also be suitable. However, a contact lens is worn much closer to the retina of the wearer than a spectacle lens is. For this reason, in a contact lens, the wanted values of angle of diffusion may extend, for some applications, to a broader range than 2° to 40°, and may for example extend up to 170° in an application where the whole retina is to be illuminated by a beam of scattered light.

Optionally, the holographic diffusive element may be configured such that most of the light scattered by the holographic diffusive element is reflected. Such holographic diffusive element may be referred to as a "holographic diffusive mirror".

Optionally, the holographic diffusive element may be configured such that most of the light scattered by the holographic diffusive element is reflected from the external environment toward the external environment or alternatively from the back surface toward the wearer. In other words, the holographic diffusive element may be configured such that, when the optical element is worn by a wearer facing a scene, most of the light scattered by the holographic diffusive element is reflected towards the scene. Alternatively, in the case where a source of light is embedded in a spectacle frame, the holographic diffusive element may be configured such that, when the optical element is worn by a wearer facing a scene, most of the light scattered by the holographic diffusive element is light originating from said embedded source of light and reflected towards the wearer.

The optical element may further comprise at least one additional holographic element configured such that most of the light scattered by the holographic diffusive element is reflected. Such holographic element may be referred to as a "holographic mirror". Said additional holographic mirror may be diffusive as well, thus also be a "holographic diffusive mirror".

In an example, the optical element comprises two opposing main surfaces and each of the holographic diffusive element and the at least one additional holographic element extend respectively over non-overlapping areas of the same main surface.

Optionally, each of the holographic diffusive element and the at least one additional holographic element are arranged according to a lattice structure, preferably a circular, squared or hexagonal lattice structure.

Optionally, each of the holographic diffusive element and the at least one additional holographic element are arranged according to a random pattern.

Diffusive elements obtained by photolithography, or mechanically obtained for instance by blasting, intrinsically roughly follow Lambert's emission law. In other words, such diffusive elements have roughly the same radiance when viewed from any angle, both in transmission and in reflection.

On the contrary, holographic diffusive elements may be adapted so as to either mostly reflect a primary scattered beam of light, while limiting, or even preventing, transmission of a secondary scattered beam of light.

Conversely, holographic diffusive elements may be adapted so as to either mostly transmit a primary scattered beam of light, while limiting, or even preventing, reflection of a secondary scattered beam of light.

This allows, for example, only directing a single scattered beam of light towards an eye of the wearer, while preventing a simultaneous emission of a secondary beam of light in an angular direction where an observer may be located.

Optionally, the holographic diffusive element may be configured such that most of the light scattered by the holographic diffusive element is transmitted.

Conversely, the at least one holographic diffusive element may be adapted so as to either mostly transmit a primary scattered beam of light, while limiting, or even preventing, reflection of a secondary scattered beam of light.

At least one holographic diffusive element may be formed by various optical materials, which may either be mostly transparent to scattered light having a given wavelength, that is to say having a transmittance higher than 95%, or higher than 98%, or higher than 99%, or may on the contrary absorb a significant portion of light having said wavelength. For example, one such optical material may have a transmittance smaller than 95%, smaller than 90%, smaller than 80% . . . Filtering light may for example be useful for preventing glare or for limiting the amount of harmful light brought towards an eye of the wearer.

Optionally, the at least one holographic diffusive element is at least two holographic diffusive elements disposed at the same or different areas on the at least one main surface.

Multiple holographic diffusive elements may have different purposes, which may be synergistic. For example, a combination of two holographic diffusive elements may scatter an incident beam of light towards different central angular directions and/or with different angles of diffusion. For example, a combination of holographic diffusive elements, each being selective in wavelength, may scatter a combination of selected wavelengths while not altering any other wavelengths.

Optionally, the at least one holographic diffusive element is a holographic gradient diffusive element, the holographic gradient diffusive element having a diffusion efficiency which increases from the center of the holographic diffusive element to the periphery of the holographic diffusive element. The holographic diffusive element may also scatter light as a solid diffusion cone. The diffusion efficiency of the holographic diffusive element may further, or alternatively, depend on the angle of incidence, on the amplitude, on the opening angle and/or on wavelength.

Gradient diffusive elements allow providing smooth visual sensations to the wearer, both in static view and during eye movements of the wearer.

The disclosure further describes an optical equipment comprising at least one optical element above. For example, the optical equipment may comprise at least one optical element comprising one or more holographic diffusive mirrors.

The optical equipment may be eyewear comprising a pair of spectacle lenses mounted on a spectacle frame. At least one of the spectacle lenses may be an optical element as defined above.

Optionally, the optical equipment may further comprise a light source arranged in the angular direction of incidence and configured to emit the source beam of light.

Such light source may be attached or incorporated to a spectacle frame, such as a temple, a lens frame or a bridge.

Such light source may be configured to emit monochromatic or polychromatic light in the visible, IR or UV spectra.

Such light source may be used for activating a holographic element which may be incorporated in the optical element. The optical equipment may thus for example be an augmented reality device.

Such light source may be used for activating a photochromic element which may be incorporated in the optical element, for example for controlling the transmission or another optical property of the optical element.

For example, the optical equipment may comprise a motion sensor intended to acquire a signal as function of a motion of the wearer, wherein the light source is lit on when the acquired signal has a predetermined value. In other words, the motion sensor is configured to detect the position and/or the posture of the wearer in order to know if the wearer realize a near vision task. If the sensor detects that the wearer is currently undergoing a near vision task, the light source lights on to activate the holographic diffusive element.

The disclosure further describes a method for recording a holographic medium onto an optical lens, the method comprising:
  providing an unrecorded optical lens comprising a recording medium extending over an area of interest, the unrecorded optical lens having two main surfaces providing a diffusive object, and recording a holographic diffusive element on the recording medium by simultaneously illuminating the area of interest with:
  a reference beam being a beam of coherent light, and
  an object beam being a beam of coherent light scattered through the diffusive object to obtain a recorded optical lens,
wherein the diffusive object, the reference beam and the object beam are configured so that the recorded holographic diffusive element has diffusive properties resulting from spatial variations of refractive index of said holographic diffusive element, said spatial variation of refractive index being greater than 0.001 at at least one given wavelength, on a distance less than 30 µm. For example, while recording the holographic diffusive element, the object beam may be obtained by directing at least part of the beam of coherent light used as reference beam towards an arrangement of the diffusive object (33) and of a mirror (331) so that said at least part of the beam of coherent light is reflected by the mirror and scattered by the diffusive object.

The mirror may be plane or curved depending on the desired optical properties of the holographic diffusive element to record. The mirror may be deformable, or adaptive, in other words controllable to obtain a desired curvature.

The disclosure further describes a method for recording a holographic medium onto an optical lens, the method comprising:
  providing an unrecorded optical lens comprising a recording medium extending over an area of interest, the unrecorded optical lens having two main surfaces modelling optical properties of a diffusive object, and recording a holographic diffusive element on the recording medium by simultaneously illuminating the area of interest with:
  a reference beam being a beam of coherent light, and
  an object beam simulating a beam of coherent light which would be scattered by the diffusive object to obtain a recorded optical lens,
wherein the diffusive object, the reference beam and the object beam are configured so that the recorded holographic diffusive element has diffusive properties resulting from spatial variations of refractive index of said holographic diffusive element, said spatial variation of refractive index being greater than 0.001 at at least one given wavelength, on a distance less than 30 µm.

For example, while recording the holographic diffusive element, the reference beam may be provided by a source facing one of the two main surfaces, and the object beam may be provided, in other words shaped by a spatial light modulator used as a programmable diffuser and reflector, facing the other one of the two main surfaces. Of course, as in any interference set-up, both beams are actually emitted by the same primary source of light, then directed, shaped, transformed, etc. by suitable optical means to both be incident on a given point, so that superposition of waves occurs at that point.

Here, it is proposed, to record a holographic diffusive mirror, to provide the reference beam to be incident on one main surface of the optical element and to provide the object beam to be incident on the other, opposite, main surface of the optical element, through suitable optical means. This means that the beams are counter propagating.

Conversely, it is proposed, to record a holographic diffusive transmissive element, to provide both the reference beam and the object beam to be incident on the same main surface of the optical element through suitable optical means. This means that the beams are copropagating.

Optionally:
while recording the holographic diffusive element, the spatial light modulator is arranged in a first position to emit the object beam, and
the method further comprises recording an additional holographic diffusive element on the recording medium by simultaneously illuminating an additional area of interest with the reference beam and an additional object beam simulating a beam of coherent light which would be scattered by an additional diffusive object,
the spatial light modulator being arranged in a second position to emit the additional object beam while recording the additional holographic diffusive element.

Optionally, while recording the holographic diffusive element,
the reference beam is emitted by a source facing one of the two main surfaces, and
the object beam is emitted by a spatial light modulator used as a programmable diffuser and facing a mirror arranged so that the object beam reflected by the mirror is directed towards the other one of the main surfaces to illuminate the area of interest.

Such mirror may be plane or curved depending on the desired optical properties of the holographic diffusive element to record. Such mirror may further be adaptive, or deformable.

Both of the above methods may each further comprise obtaining a parameter related to a wearer and/or to a spectacle frame and determining the central angular direction and/or the wanted value of the angle of diffusion based on the obtained parameter.

For example, such obtained parameter may be used downstream for providing the diffusive object or for modelling its optical properties.

For example, considering the diffusive object has already been provided or its optical properties have already been modelled, such obtained parameter may be used for configuring the reference and object beams so as to record the holographic diffusive element.

BRIEF DESCRIPTION OF THE DRAWINGS

FIGS. 17A, 17B, 17C, 17D, 17E and 17F each depict a different variant of the exemplary holographic setups of FIG. 16A or 16B.
FIG. 18 depicts the diffusion of light from a scene by an optical element comprising a diffusive holographic mirror.

The previous figures are just illustrations of possibilities of devices. The scales are obviously not respected for clarity of the figures. Moreover, each light beam may be monochromatic or polychromatic, without limitation on wavelength range.

DETAILED DESCRIPTION

Figure 1:
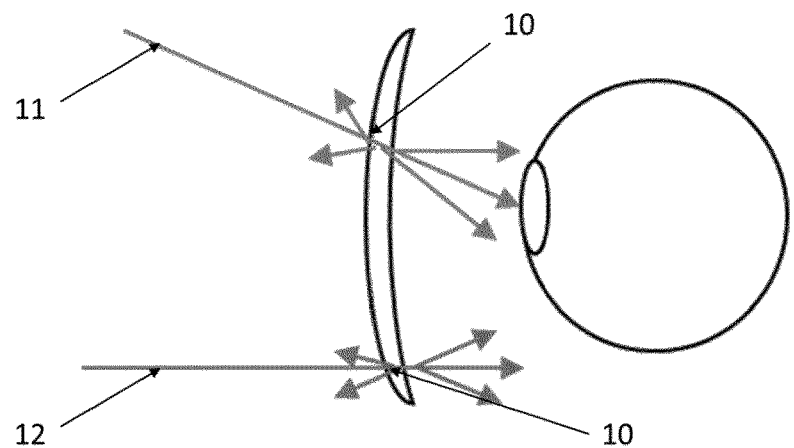
FIG. 1 illustrates a known diffusing optical element.

It is now referred to FIG. 1 which illustrates a known diffusing optical lens comprising, for the purpose of scattering incident light, small size elements such as micro bumps or micro recesses. Such small size diffusing elements (10) are typically made on the surface of the optical element using photolithography methods.

When such known diffusing lens is placed in front of an eye of the wearer, the small size elements (10) may provide some useful diffusion of some incident light rays (11). Useful diffusion refers to a diffused light ray or beam reaching a target zone, here reaching the pupil of the eye of the wearer. In a context where a goal is to slow down a myopia evolution, useful diffusion may refer to projecting a blurred image in front of the retina.

However, the small size elements (10) also provide mostly useless diffusion of other incident light rays (12). Useless diffusion refers to a diffused light ray or beam not reaching a target zone, here not reaching the pupil of the eye of the wearer.

Another drawback is that, for an observer, all incident light rays (11, 12) are also backscattered, appearing as bright spots on the surface of the optical lens, thus reducing cosmetics of the optical lens.

Another drawback is that in case of outdoor activity, incident sun light is subject to a high level of diffusion and to a low contrast, which may be detrimental to visual comfort.

It is proposed to replace the small size diffusing elements above with diffusers made in the thickness of the optical element using holographic methods.

Holographic diffusers are easy to produce, may incorporate various additional optical functions, and may be customized to the needs of each individual wearer or to the preferences of brands.

More specifically, the holographic diffuser is recorded so as to exhibit angular-selective diffusive properties either in reflection or in transmission.

To do so, the holographic diffuser has spatial variations of refractive index greater than 0.001 at at least one given wavelength, on a distance less than 30 μm.

Figure 2:
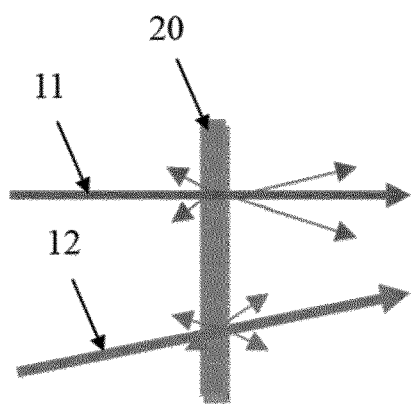
FIG. 2 depicts a difference in diffusive properties between the known diffusing optical element of FIG. 1 and an optical element according to an exemplary embodiment.

As depicted on FIG. 2, contrary to known optical elements comprising diffusing elements such as recesses or bumps which scatter light roughly equally in all directions, both in reflection and in transmission, optical elements comprising one or more holographic diffusers (20) may be configured to preferentially scatter light in a predetermined angular zone. For example, light from different light rays (11, 12) may be scattered by a given holographic diffuser (20) so as to preferentially illuminate a target angular zone, while less illuminating other angular zones, and while limiting backscattering.

In other words, contrary to known mechanical diffusers, holographic diffusers may be configured to provide mainly, or only, useful diffusion.

Indeed, the target angular zone corresponds to a predetermined zone surrounding a central angular position where, for example, an eye of a wearer is intended to be located.

Therefore, thanks to such holographic diffusers, most of the incident light is scattered into a target angular zone, while the energy of light scattered apart from the target angular zone is limited.

Using a holographic diffuser, the quantity of total scattered light, in every angular direction, may be reduced compared to using known diffusers obtained by photolithography techniques while still providing the same amount of light towards the target angular zone.

With such diffusive properties, the holographic diffuser may provide better cosmetics as well as a reduced loss of contrast for outdoor activities.

The size, position and orientation of the predetermined angular zone shall depend on the application. Holographic diffusers may be configured so that the size of the predetermined angular zone is in a range from 2° to 40°, for example from 2° to 37° wide around the central angular position. Such size is particularly adapted for holographic diffusers incorporated in spectacle lenses. Such holographic diffusers may be designed, for example, to scatter environmental light and be incorporated in an optical lens of any kind of active or passive eyewear. Such holographic diffuser may also be incorporated in an active eyewear comprising a light source and be designed, for example, to scatter light emitted by said light source.

It is possible to further configure holographic diffusers to only scatter light coming from a specific angular direction of incidence. An example of configuration is to only, or mainly, scatter light coming from lowering gaze angles associated to near vision activities, which are myopiagenic activities. At the same time, the holographic diffuser may be configured so as not to scatter, or so as to comparatively less scatter, light coming from lowering gaze angles associated to intermediate or far vision activities, which are beneficial activities for slowing down progression of myopia.

This may be achieved for example by recording different patterns of diffusion: for instance, a low diffusion in a central part of the optical element, and a stronger diffusion in a peripheral part of the optical element. With such configuration, an optical element comprising such holographic diffuser allows slowing down progression of myopia of a wearer during every type of vision activity of the wearer.

By "slowing down progression of myopia", it is meant that the optical function provided by the holographic diffuser prevents focusing on the retina of the eye of the wearer under standard wearing conditions, so as to reduce the progression of an abnormal refraction of the eye. In such a case, the holographic diffuser may scatter light across, for instance, a 1° to 30° wide angular region around a central direction of propagation.

Figure 3:
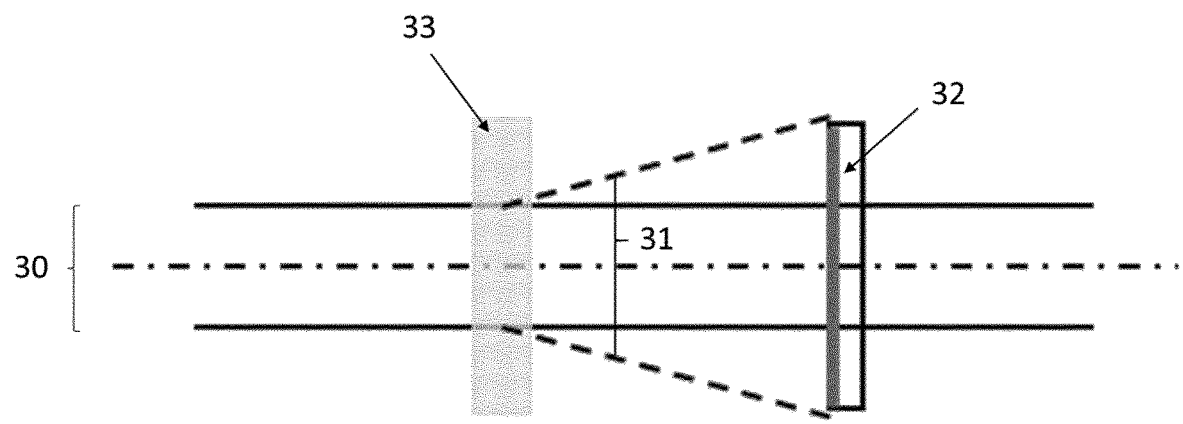
FIG. 3 shows the principle of an exemplary setup useable to record a holographic diffuser.

The general principle of holographic recording method is described thereafter. FIG. 3 shows the principle of an exemplary setup useable to record a holographic diffuser.

Holographic recording is a method that allows the fabrication of exotic and made-to-measure components. The idea is to record in or on a medium, which may be for example a holographic material or a CCD camera, an optical function through the interferences between a reference beam (30) and an object beam (31). The recorded object or recorded optical function may either be a transmission object or a reflective object.

A photosensitive material is deposited (photopolymers or dichromated gelatin) on a substrate before the exposition in a holographic setup. The substrate may be transparent (like glass or polymer) or not. The substrate may be dyed. The substrate is preferentially not birefringent to avoid potential problems of homogeneities in holographic recording. The substrate can be flat or curved. The substrate may also be called "plate" in this document. The substrate covered with a layer of photosensitive material may also be called "holographic plate" (32) in this document. The photosensitive material may be for example dichromated gelatine or photopolymers. The layer thickness of sensitive material is comprised generally between 10 and 100 μm, for example between 15 μm and 50 μm. These materials can be made sensitive to visible or non-visible light. One material can be sensitive to several wavelength ranges (blue and green for example). It is possible to have several layers of different materials sensitive in different ranges of wavelengths. The photosensitive material may be deposited on one of the main surfaces of an optical element, (i.e. on the eyeball-side main surface, or on the object-side main surface, or on both if desired, for example, to provide two different layers with two different functions).

The eyeball-side main surface may be preferred due to being typically less exposed to impacts than the object-side surface.

The object-side main surface may be preferred when, for example, the optical element is tinted and comprises holographic diffusive mirror.

To record an image in a holographic setup, a physical or virtual object (33) is required. For transmission holographic diffusers this object will be a transmission object. For reflection holographic diffuser, it can be transmissive and/or reflective.

The exemplary method of FIG. 3 to record a holographic diffuser is based on the use of a mechanically-made object (33).

The optical characteristics of the object (33) are carefully chosen and match the desired optical characteristics for the holographic diffuser to be recorded.

Indeed, holographic diffusers recorded using a given object have optical characteristics close to the ones of the given object. In other words, when illuminating a holographic diffuser with the same source light beam as used on the given object to record the holographic diffuser, the holographic diffuser scatters said source light beam almost the same way as the given object does.

Any recorded holographic diffuser may also be further used as a master holographic diffuser, that is to say as an object (33) for subsequently recording other, mostly identical, holographic diffusers.

Instead of using a mechanically-made object, a virtual object (33) made with computer generated hologram (CGH) may be used. In this case, the interference pattern is calculated thanks to a computer. For a diffuser, it is a random interference pattern. One of the first algorithms has been introduced by Lohmann and Brown in 1969. It allows the calculation of binary holograms. Other methods can be used to increase the diffraction efficiency. With CGH, the hologram is calculated and contains all the needed images and functions, as a diffuser and another optical function for example. It is also possible to use a transmission amplitude and/or phase spatial light modulator (SLM). SLM allows to successively select different objects (33) whenever needed to adapt to various applications.

Objects 33 may further exhibit at least part of the sought optical characteristics of the holographic diffusers to be recorded, like deflection angle, angular selectivity, shape, grain, focalisation effect, and so on.

Figure 4:
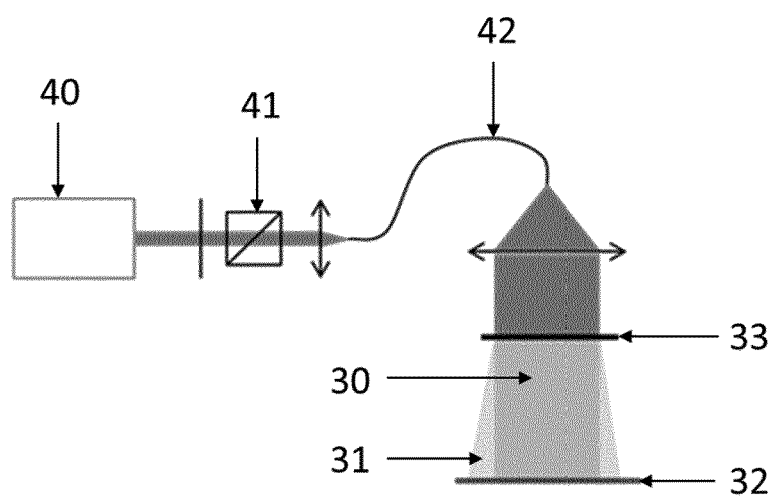
FIG. 4 depicts an exemplary holographic setup for recording a holographic transmissive diffuser.

It is now referred to FIG. 4, which depicts an exemplary holographic setup for recording a holographic transmissive diffuser. On FIG. 4, a coherent source of light (40), such a laser, emits a beam of light which is optionally split into two portions (or beams), each having a specific polarization, using a polarization beam splitter (41). When the second portion is not necessary for the holographic setup, the polarization beam splitter (41) manages the incident power of the reference beam (30). The beam circulates, using a polarization-maintaining fibre (42) and the object (33) is placed on its path. Due to the optical properties of the object, one portion of the beam is transmitted by the object (33) without being scattered, and forms a reference beam (30) while the other portion of the beam is scattered by the object (33) and forms an object beam (31).

Generally speaking, a beam exiting a polarization maintaining fibre is always divergent.

It may be desired, for instance, to collimate such a beam. To do so, in the example of FIG. 4, an optical lens may be arranged in between the polarization maintaining fibre and the object (33). In this example, the optical function of such optical lens is chosen so as to collimate the incident beam.

According to other examples, the optical function of such optical lens may alternatively be chosen such that the beam directed towards the object (33) is more divergent, less divergent, or convergent.

According to yet another example, it is possible to directly orient the beam exiting the polarization-maintaining fibre towards the object (33) without placing an optical lens in between.

More generally, holographic setups are built to expose the substrate to, at least, an object beam (31) and a reference beam (30). Optionally, a single beam of light may be split into two beams using a polarization beam splitter (41). These two beams may then be used, respectively, as reference beam and object beam. It may be required to use additional beams, which may be provided through use of one or more additional polarization beam splitters. The aperture, the orientation of these two beams, the distance between the two beams, the distance between the object and the holographic plate, the wavelength of the source and the number of beams (at least two, but more than two beams may be needed) allow defining the holographic diffuser. WO 2016156614 A1 describes a general known principle of holographic recording applied to ophthalmic optics and the recording parameters influencing the optical properties of the recorded holographic elements.

The object (33) may be placed on the path of the reference beam (30), so as to both transmit the reference beam (30) and scatter light according to the optical properties of the object (33), thus generating the object beam (31). The interference pattern between the reference beam (30) and the object beam (31) at the holographic plate (32) is used to record the holographic diffuser. Extra beams of light may be further used.

In a general case, interference patterns for recording the holographic diffuser may be obtained between different diffused beams (different object beams) and, if already present, the transmitted reference beam.

Figure 6:
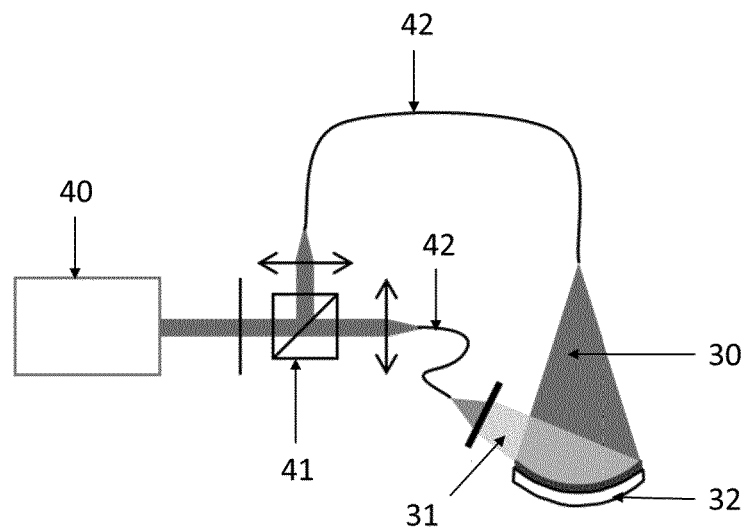
FIG. 6 depicts an exemplary holographic setup for recording a holographic transmissive diffuser having a specific angular selectivity.

With the setups presented in FIGS. 4 and 6, it is possible, if wished, to take into account an orientation of the holographic plate (32) in the optical element the holographic diffuser is to be recorded. For diffusing lenses, it is allowed to manage grain, color, angles, distribution of intensity, pattern of diffusion, wavelength of use, uniformity of diffusion and so on. The holographic diffuser may be configured to be transmissive-only or reflective-only or both transmissive and reflective.

A diffuser may be characterized through its diffusion efficiency, diffusive coefficient or grain. The management of the grain can be obtained thanks to the choice of the grain of the diffusive object (33) and/or of the distance between the holographic plate (32) and the diffusive object (33). Classical recording parameters, such as energy used for recording are also ways to manage haze, grain and more generally efficiency of the holographic diffuser. Generally speaking, at a given wavelength, the holographic diffuser has a diffusion efficiency, or haze, that is expressed in percentage. It is possible to obtain a haze coefficient ranging between less than 1% and 100%. A diffusion efficiency of 100% means that the entirety of an incident beam of light is scattered. Disregarding light absorption, a diffusion efficiency of 50% means that half the energy of an incident beam of light is scattered, the rest being transmitted, or reflected, without being scattered. Haze may be chosen for example between 5 and 20%, although higher values up to 45% are possible, in order to avoid an important perturbation of direct sighting through the optical element. In the context of optical elements for the exemplary purpose of controlling evolution of myopia, a diffusion efficiency below 50% and greater than 5% allows providing to a wearer a mostly clear image of a scene, with a manageable level of blur. A diffusion efficiency lower than 5%, for example lower than 2%, or lower than 1%, may however still be suitable and even preferrable for some other applications, such as for an aesthetical application focused on influencing the color of at least part of the optical element as seen by an observer. The grain of the diffuser may be for example lower than 1 µm for high haze diffuser (measured on 80% diffuser) and may be higher than 20 µm for low haze diffuser (measured on 5% diffuser).

It is possible to record a holographic diffuser using coherent beams of light having a specific wavelength. The diffusion efficiency of the holographic diffuser may thus be maximal for said specific wavelength. It is possible to provide a diffusion efficiency close to its maximal value across a broad wavelength range. When such broad wavelength range is comparable to the full range of the visible spectrum, the holographic diffuser allow providing a stronger action on the evolution of myopia.

It is possible to record a holographic diffuser using a plurality of coherent beams of light, each having a specific, respective, wavelength. The diffusion efficiency of the holographic diffuser will thus be maximal for said specific wavelengths.

Said wavelengths may for example correspond to those generally emitted by display screens. As a result, the holographic diffuser scatters light emitted by such display screens without significantly scattering sunlight. Therefore, the holographic diffuser may be made operational specifically for the activities related to viewing electronic display devices.

The surface roughness of the optical element is unaffected by the holographic diffusive element. For example, the optical equipment may be coated. The surface roughness of a homogenously deposited coating may be comprised between 0.05 and 0.5 µm, resulting in the surface roughness of the optical element being lower than 0.5 µm.

The shape of the holographic diffuser is another manageable parameter. It may be round, elliptical, squared, ring-shaped, and so on. Shape depends mainly on the shape of the reference beam (30). The holographic diffuser can thus cover the whole optical element or just a part of the optical element, like a round part, a ring, and so on. The holographic diffuser can be recorded area-by-area. A selected area may be kept clear of any holographic diffuser thanks to a mask or a masking plate.

The output beam may also be round, square, ring-shaped, line-shaped and so on, and its shape depends mainly on the shape of the object beam (31), chosen based on a desired angular acceptance for illuminating, for example, the entrance pupil of the wearer.

The holographic diffuser may be configured to scatter incoming light uniformly perpendicularly to the surface of the plate or may bring at least one angle of diffusion. This diffusion angle may also be managed through the optical setup. It is, for example, possible to record a diffusive ring. An example of application is an optical element comprising a holographic diffuser configured to deviate light from the fovea to another point of the retina.

The holographic diffuser may be achromatic and may diffuse equally the whole visible spectrum, or may be monochromatic and may diffuse only a narrow range of visible spectrum. This spectral selectivity may be managed through the nature of the holographic material and through the duration and power of exposure (energy). It is thus possible to propose a holographic diffuser that is efficient for the at least three wavelengths corresponding to RGB light coming from a display screen of a smartphone, for example. A possible use is for reducing evolution of myopia due to use of screens in near vision.

Multiple holographic diffusers may be incorporated in a single optical element, with different shapes or grains on different areas, for example. Each holographic diffuser may extend on a separate area and have different optical characteristics (grains, shapes, directions, wavelengths . . . ). Alternatively, the holographic diffusers may extend on overlapping areas. The local optical properties of the optical element may thus be an addition of the optical properties of different diffusers. For example, at least two diffusers may be used, each being specific to a different wavelength, to have different diffusing directions or shapes or focalisation areas on the retina. Possible uses include chromatic aberration compensation, or inversion, for example.

It is possible to configure the holographic diffuser to have a specific optical function. This optical function may relate to transmission or reflection (for example the holographic diffuser may also be a holographic mirror), to spectral properties (for example the holographic diffuser may absorb light in a given wavelength range, thus also be a filter), to a dioptric function (for example the holographic diffuser may also be an optical lens, an ophthalmic lens, such as spherical, cylindrical, aspherical, an axicon, a micro lens), and so on. This secondary function can be recorded for the same wavelength range or for another one. It can be recorded on the same side of the lens, or on the opposite side. It can be recorded on the whole lens or on part of the lens.

Figure 11:
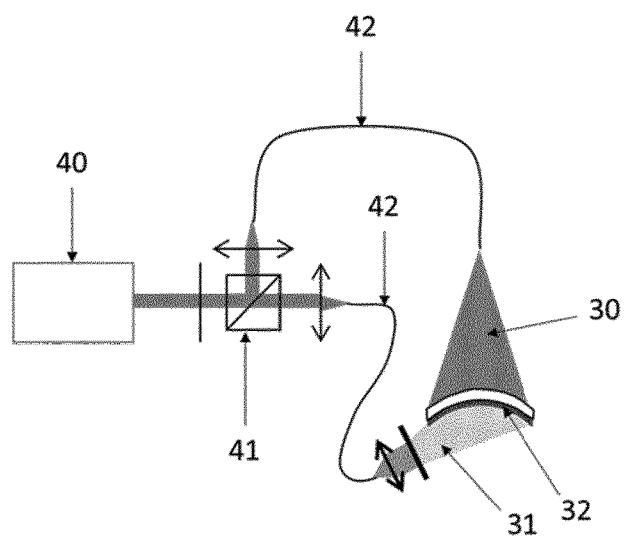
FIG. 11 depicts an exemplary holographic setup for recording a holographic reflective diffuser having a specific angular selectivity.
Figure 14:
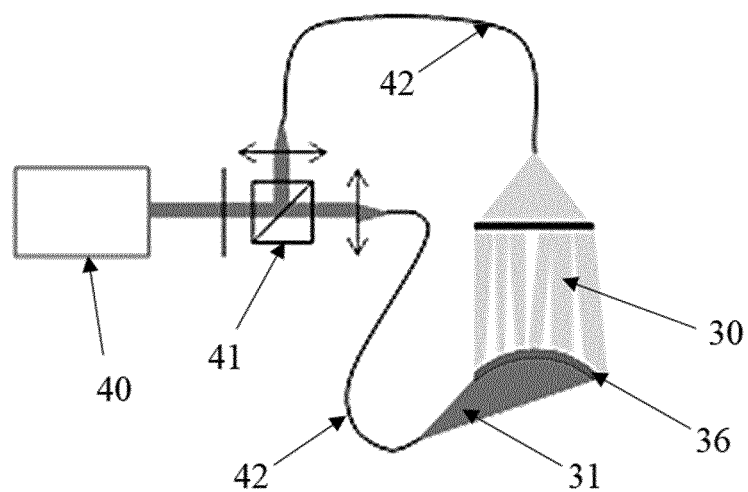
FIG. 14 depicts a generic exemplary holographic setup for recording a diffusive holographic mirror.
Figure 15A:
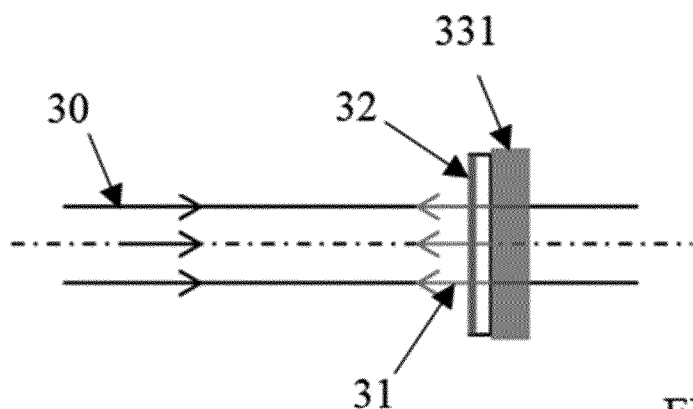
FIG. 15A depicts a principle of holographic setup for recording a plane non-diffusive holographic mirror.
Figure 15B:
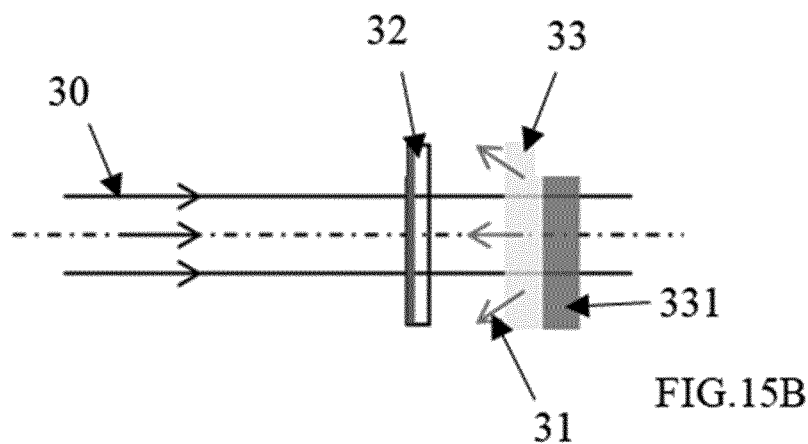
FIG. 15B depicts the principle of a holographic setup for recording a plane diffusive holographic mirror.
Figure 15C:
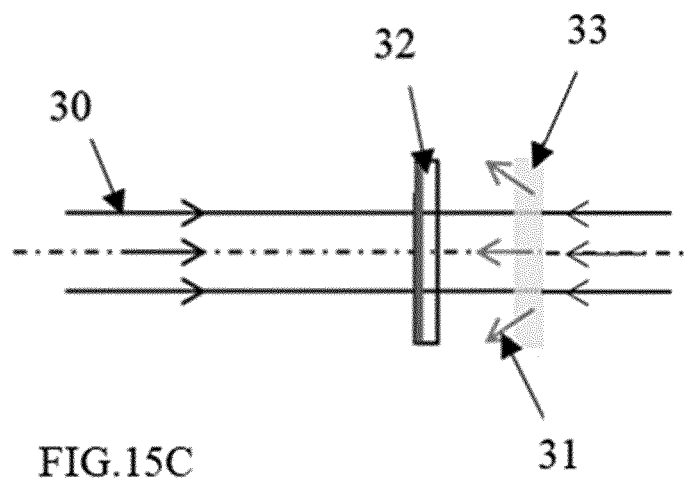
FIG. 15C depicts the principle of a holographic setup for recording a diffusive holographic mirror using two separate counter propagating beams.
Figure 16A:
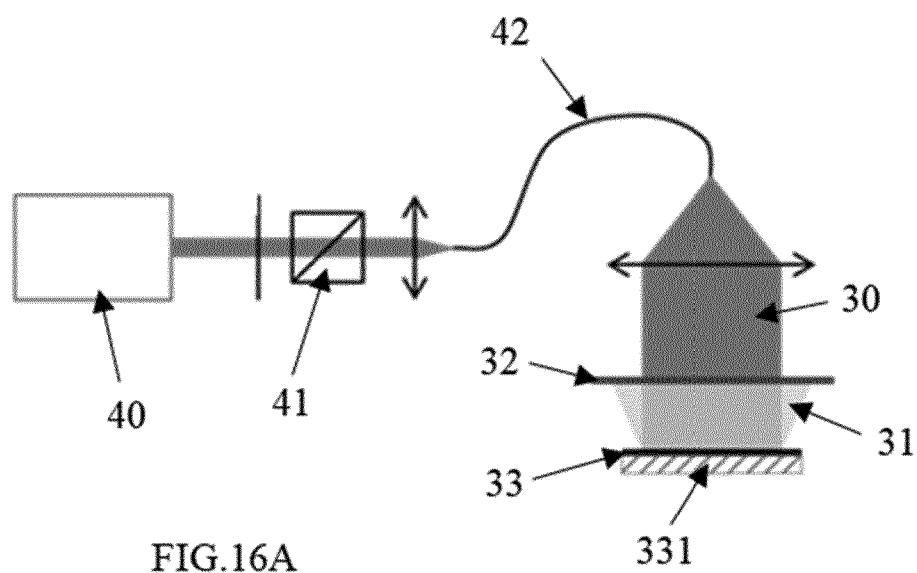
FIG. 16A depicts an example of such a holographic setup.
Figure 16B:
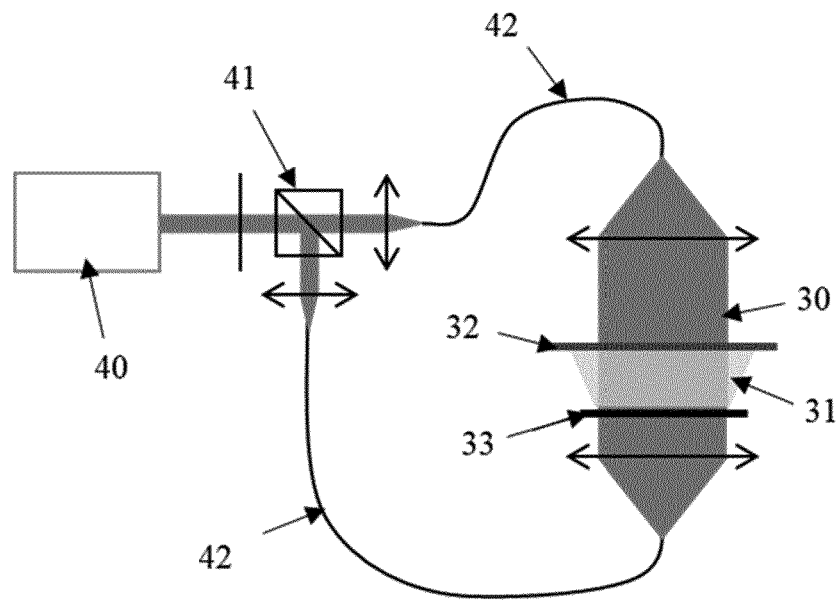
FIG. 16B depicts an example of a holographic setup for recording a diffusive holographic mirror using two separate counter propagating beams.

Reflective optical functions may be obtained by using, as reference and object beams respectively, two counter propagating beams of light, such as depicted in FIGS. 11, 14 and 16B for example. A generic principle of a setup devoid of a mirror, where two counter propagating beams of light are provided separately, is depicted in FIG. 15C. Another possibility is to provide a counter propagating object beam as a reflection of the reference beam. This may be achieved for example by adding, in the holographic setup, a mirror (331), which may either be in-axis or off-axis, be planar or curved, and so on. Examples of setups comprising such mirror for the purpose of reflecting the reference beam and providing, as a result, the object beam are depicted in FIGS. 16A, 17A, 17B and 17D. A generic principle of a setup comprising such mirror is also depicted in FIGS. 15A and 15B. Holographic diffusive elements having a reflective optical function (i.e. purely or partly reflective) may be of use in active or switchable eyewear. For example, a special embedded light source may be arranged to illuminate the holographic diffuser from the same side as the eye of the wearer is located when the eyewear is worn. The holographic diffuser may thus reflect and scatter the light from the embedded light source, for example, back to the eye of the wearer. Such holographic diffuser may be recorded using a setup such as in FIG. 11.

Figure 5:
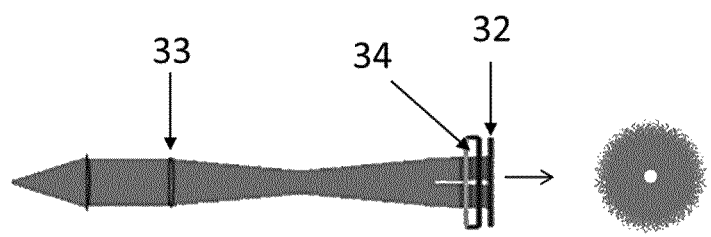
FIG. 5 depicts an exemplary holographic setup for recording an axicon-shaped holographic transmissive diffuser.

Transmissive optical functions may be obtained by including, in the holographic setup, a specific lens (34), for example an axicon as illustrated on FIG. 5 or a diffusive meniscus, or by managing the shapes of the interfering beams. A possible use is to adjust the shape and/or position and/or spatial extension of the diffused image and/or the focus of this image on the retina, and/or the shape of the diffuser on the optical element. For example, a holographic diffuser may be formed to extend only over an edge of the optical element.

The optical functions defined above may allow integrating various services provided by a smart eyewear, like light or distance measurement, image display, and so on.

Holographic gradient diffusers are a type of possible holographic diffusers. One way to record such diffusers is to duplicate a master gradient diffuser that has been mechanically obtained. Another way is to manage the energy of the recording beams, by using, for example, a gradient round density, in order to obtain a round gradient holographic diffuser.

Similarly, a gradient linear density may be used to obtain a linear gradient holographic diffuser. A possible application of gradient diffusive elements is now described. Considering an optical element with a linear gradient holographic diffusive mirror, such diffusive mirror provides, for an observer, a visual effect that is disconnected from the lightning of the optical element. A light coming from the lower part of the optical element can for example cause a diffuse reflection on the center on the optical element but not in the bottom of the optical element. It is also possible to record a linear gradient holographic non-diffusive mirror, if desired.

The center of the gradient has preferably a low haze, or may be a hole without haze, and the haze may increase with the distance of the diffusing area from the center of the diffuser. The gradient round density is thus darker in the center and becomes lighter on its edge.

As for the example of the axicon, the reference and object beams management may allow the realization of a holographic diffuser covering the whole optical element and having a specific angular selectivity. Possible setups for recording such holographic diffuser are depicted on FIG. 6, for a holographic diffuser in transmission, and on FIG. 11, for a holographic diffuser in reflection. This selectivity may be linked for example to the need to diffuse light only when the wearer is reading, and for example, looking on the bottom of the lens.

A source of coherent light (40) emits a beam of light which is split by a polarization beam splitter (41) into two beams of light, which are separated. Each beam of light circulates through a respective polarization-maintaining optical fibre (42). One beam of light is used as a reference beam (30) and directly illuminates the holographic plate (32). The other beam of light illuminates the holographic plate from a different angular region of incidence compared to the reference beam (30). A diffusive object is placed on the path of that other beam of light. The scattered light forms the object beam (31). The holographic diffuser is recorded thanks to the interference pattern formed on the holographic plate (32) between the reference beam (30) and the object beam (31).

In this case, when the optical element is worn in front of an eye of a wearer, the holographic diffuser may scatter incident light coming from an angular zone corresponding to a region seen by the wearer through the bottom of the optical element towards a specific spot or a larger area of the retina on the wearer. In such case, the angular direction of incidence corresponds to near vision of the wearer. A focalization may occur either in a plane situated in front of the retina of the wearer or in a plane tangential to the retina of the wearer. The focalization may be achieved by configuring the object beam of the recording setup to provide a specific optical function, corresponding for example to a lens, for example an axicon.

In this case, although incoming light from a specific direction of incidence is scattered by the holographic diffuser, the vision of the wearer for incoming light from any other angular direction of incidence is transmitted, by the holographic diffuser, without being affected by haze.

Another advantage is that someone looking at the wearer does not see any haze, diffuse reflection or impression on the worn optical element. Effectively, out of the angle of diffusion, the lens transmission is close to 100% with a haze close to 0%, i.e. equal to the classical haze of the optical element if it did not comprise any diffuser. Such a holographic diffuser for near vision may be recorded on the whole optical element as described above, or may alternatively be recorded only on a part of the optical element.

Such near vision diffusing properties may also be combined with a lens effect leading to the focalization of the light coming from a short distance of the wearer (for example in a situation of near vision, like reading), with a diffuse effect, on the retina or the pupil of the wearer. This may be obtained thanks to the addition of a lens to the object (33) in the recording setup.

Such near vision diffusing properties may also be combined with angular selectivity. This allows avoiding unpleasant reflections for an observer of the wearer. Such holographic diffusers may either be recorded on the whole optical element or on one or more parts of the optical element.

When combining in a holographic diffuser near vision diffusing properties with a lens effect or with angular selectivity properties, the resulting haze is however limited to values ranging from 0% to less than 50%.

In complement to the previous description, the following discussion describes two examples of recording setups for recording holographic diffusers, the purpose of which is to maximize useful diffusion while minimizing useless diffusion.

For the sake of pedagogy, and in order to provide accurate figures, both examples refer to recording a holographic diffuser in between two main surfaces of a spectacle lens which is to be mounted on a spectacle frame.

Moreover, in both examples, useful diffusion refers to scattered light entering an eye of the wearer when the spectacles are worn.

In order to minimize the amount of useless diffusion, it is proposed that one of the recording beams: either the reference beam (30) or an object beam (31), converges towards a predetermined angular direction where a reference point of the eye is to be located when the spectacle frame is worn. Examples of reference points may include the center of the pupil or the eye rotation center.

Then, when the recorded holographic diffuser is illuminated by a beam of incident light, said light is scattered into a beam of scattered light, directed towards a target angular zone, around a central angular direction matching the above predetermined angular direction.

The diffusion angle may be defined for instance so that it covers in the cornea position an area close to the pupil size, for instance between 1 mm to 8 mm. For instance, a beam of scattered light which diffusion angle, defined as a full width at half maximum of luminance, has a value of about 17° may illuminate a 4 mm wide area located at a distance of about 14 mm from the lens.

Doing so, most of the light being diffused will reach the eye, and the amount of global diffusion of the lens may be limited. Indeed, if one was to illuminate the eye of the wearer with the same amount of light by using, instead of a holographic diffuser, a classical diffuser made by lithography, it would be necessary for the classical diffuser to globally scatter, all angular directions considered, a much higher amount of light.

For this case, the diffuser can cover the whole lens, or just a small part in (or really close to) the center of the lens and the amount of diffused light can be increased by guiding light from peripheral areas of the lens to the diffusing area thanks to guiding in holographic medium. The light coupling can be obtained by diffusing or grating area.

The following table provides some values of diffusion angles for different wearing situations of a spectacle lens.

| Pupil diameter (mm) | Eye-lens distance (mm) | Diffusion angle (deg) |
|---|---|---|
| 2 | 12 | 9.5 |
| 8 | 12 | 37 |
| 2 | 15 | 7.6 |
| 8 | 15 | 30 |

In the case of a contact lens, the distance between the contact lens and the pupil is around 3 to 5 mm. The following table provides values of diffusion angles for different wearing situations of a contact lens.

| Pupil diameter (mm) | Pupil-contact lens distance (mm) | Diffusion angle (deg) |
|---|---|---|
| 2 | 3 | 37 |
| 8 | 3 | 106 |
| 2 | 5 | 23 |
| 8 | 5 | 77 |

Figure 7:
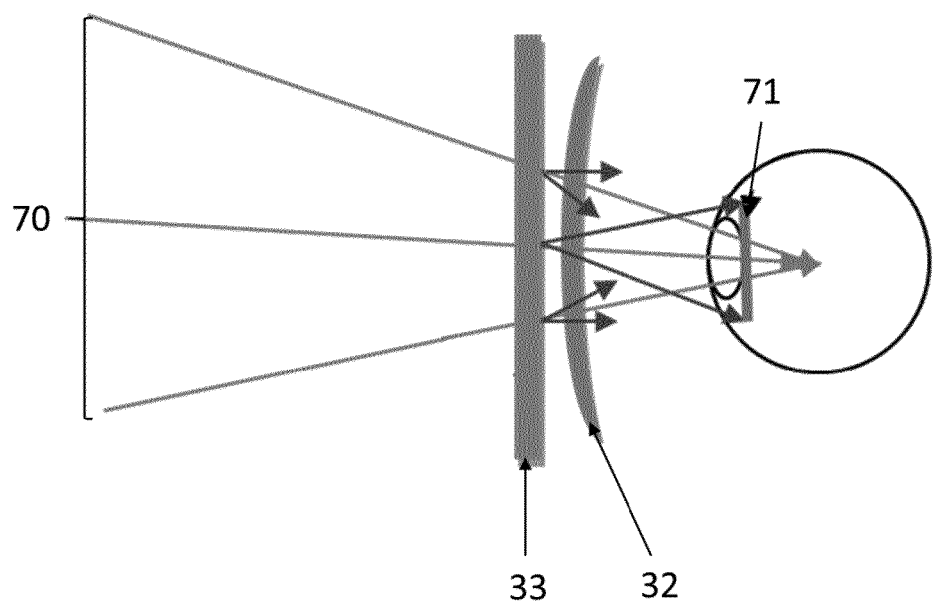
FIG. 7 shows a principle of an exemplary setup useable to record a holographic diffuser which scatters light towards a target angular zone.

FIG. 7 schematically represents an exemplary recording principle, along with an image of the eye to clarify the effect of the recorded holographic diffuser. FIG. 4 is an example of a corresponding recording setup.

In this example, a diffusive object (33) is illuminated by at least one polarized beam of light, and scatters said polarized beam of light to form the object beam.

The object beam and a convergent reference beam (70) both illuminate an optical lens comprising a holographic plate (32).

The interference pattern between the object beam and the reference beam causes recording of the holographic diffuser on the holographic plate (32).

In this example, once the holographic diffuser is recorded, incident light from an angular direction of incidence matching the angular direction of incidence of the convergent reference beam is scattered by the holographic diffuser and is directed towards a target angular zone (71). The target angular zone is defined by a central angular direction and by a diffusion angle. Both the central angular direction and the diffusion angle are specific to the optical properties of the holographic diffuser. These optical properties are related to the optical properties of the diffusive object (33) in the recording setup. The diffusion angle may for example be the size of the pupil of an eye of the wearer when the optical lens is worn, or half said size, or 1.5 times said size, or twice said size.

It may nevertheless be interesting to scatter incident light coming from other directions.

For instance, activities like using mobile phone or computer are myopiagenic, and it can be useful to provide diffusion specifically for these conditions, while limiting diffusion for outdoor activity (being non myopiagenic) to enhance contrast.

Figure 8:
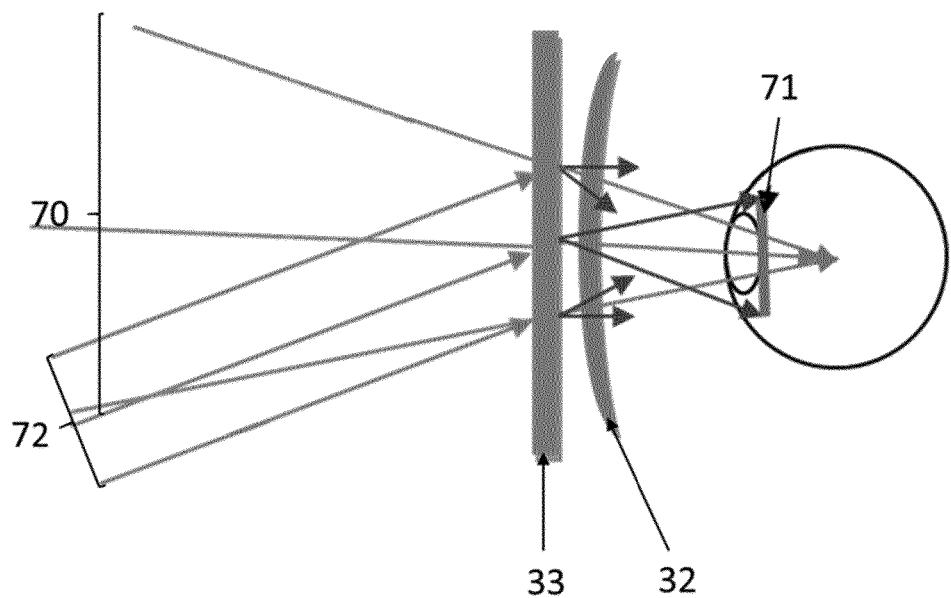
FIG. 8 schematically represents a principle of an exemplary setup useable to record a holographic diffuser which scatters light from a specific angular direction of incidence towards a target angular zone.

One way to provide such angle selectivity is for the recording setup to provide one recording beam (70) converging to the target angular zone, thus providing a wanted central angular direction, and another recorded beam (72) providing a wanted direction for diffusion. FIG. 8 schematically represents an exemplary recording principle corresponding to this example, along with an image of the eye to clarify the effect of the recorded holographic diffuser.

For instance, the reference beam (72) may be emitted from an angular direction of incidence corresponding to normal view at reading distance. At the same time, the object beam (70) may be emitted so as to be focused, after refraction by the optical lens, for example towards the eye rotation center.

For near vision (NV) applications, the angle of input light may be comprised between 0 and 80 degrees for light coming from the bottom of the lens. The diffuser may cover only the bottom third of the lens (bottom part of the lens) or the part of the lens concerned by the NV part of the progressive lens. For far vision (FV) applications, the angle of input light may be the same or may use the sky light and be comprised between 45 and 80 degrees. In this case, the diffuser may be placed in the top third of the lens, or the part of the lens concerned by the FV part of the progressive lens.

As mentioned previously and later, it is also possible to add wavelength selectivity so that diffusion occurs mainly at the wavelength used by RGB display, using holographic layer having selective spectral sensitivity.

The recorded holographic diffuser can be used as a master holographic diffuser: as a diffusive object that may be replicated using the previously described recording setups.

Alternate replication techniques may involve for instance optical replication on a photosensitive material deposed on a plastic sheet. It is also possible to project the holographic diffuser on a photosensitive material in a photolithography setup with UV exposition, for example. The photosensitive material may be the same than the holographic material. More generally, mechanically-made diffusers, holographic diffusers or CGH diffusers may be used as a diffusive object in any of the above recording setups. As a result, the diffusive object is replicated to record a new holographic diffuser.

Some exemplary uses of optical lenses incorporating a holographic diffuser are described thereafter.

Figure 9:
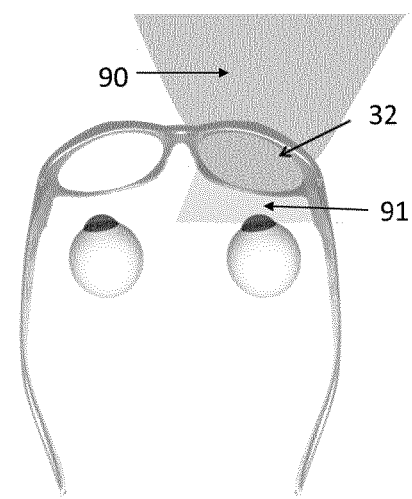
FIG. 9 depicts an example of an optical equipment comprising a transmissive diffusive lens.

FIG. 9 depicts a transmissive lens comprising a holographic diffuser (32). Ambient light (90) coming from any angular direction of incidence is scattered by the holographic diffuser (32) into a beam of scattered light (91) directed towards the eye of the wearer.

The beam of scattered light extends around a central angular direction. The angle of diffusion of the beam of scattered light may be chosen so that the whole retina is illuminated, or so that parts of the retina are illuminated.

Figure 10:
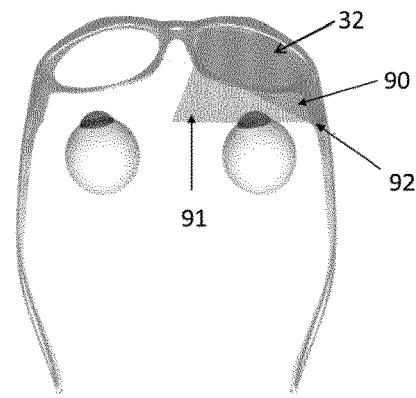
FIG. 10 depicts an example of an optical equipment comprising a light source and a reflective diffusive lens.

FIG. 10 depicts a reflective diffusive lens comprising a holographic diffuser (32). The lens is a spectacle lens mounted on a spectacle frame. A switchable light source (92) is further integrated on the frame, for example in the temple. The switchable light source (92) may be a white source, for example a LED, or a chromatic source, for example a green LED. The different kind of diffusers described above may also be used or designed for this application. Incoming light (90) from the switchable light source (92) is scattered and reflected by the holographic diffuser (32) into a beam of scattered light (91) directed towards the eye of the wearer. The beam of scattered light (91) may have the same central angular direction and angle of diffusion as in the example depicted on FIG. 9.

The optical element may further comprise extra elements configured to cooperate with the holographic diffuser. Examples of such extra elements include a light guide for guiding light towards the holographic diffusive element. This allows the optical element to scatter a greater amount of light, thus improving light intensity and, potentially, contrast.

The optical element may be incorporated to an optical equipment further comprising extra elements configured to cooperate with the holographic diffuser. Examples of such extra elements may include a light source for activating the holographic diffuser, and may further include a sensor, such as a position, motion or acceleration sensor, for triggering activation of the light source. This allows for example detecting, using the sensor, a type of visual activity of the wearer that may induce an unwanted evolution of a visual defect of the wearer. Upon detecting said type of visual activity, the holographic diffuser may be automatically activated to slow down, or prevent, said unwanted evolution.

The inventors have further developed another application of holographic recording for manufacturing optical elements and optical equipments to be used for slowing down myopia progression, without the drawbacks exhibited by known diffusive elements.

Figure 12:
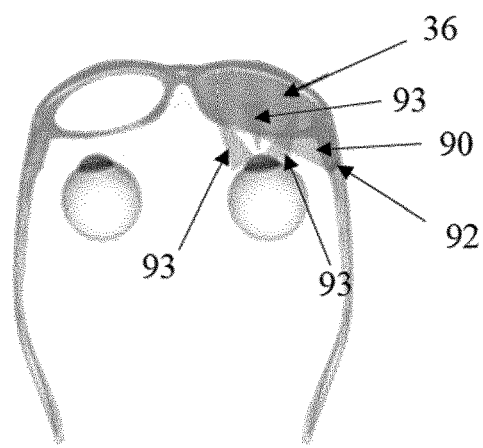
FIG. 12 depicts an exemplary optical element comprising a plurality of holographic mirrors.

Specifically, FIG. 12 depicts an optical element (36) intended to be worn in front of an eye of a wearer. This optical element has two opposite main surfaces and may be conceptually divided in a plurality of non-overlapping areas. A plurality of holographic mirrors are each arranged either within the optical element or onto one of its main surfaces and respectively extend over a different area of said plurality of areas.

All of the above explained advantages of holographic recording versus photolithography apply.

A further advantage of holographic mirrors over mechanically-formed mirrors is that holographic mirrors may be designed for a particularly thin spectral bandwidth, for example a bandwidth of 5 to 20 nm, with a particularly high efficiency. This allows the action of holographic mirrors on myopia control to be particularly efficient without impacting the vision of the wearer through the lens as much as mechanically-formed mirrors would.

In addition, some known holographic materials have a high transparency, thus allow an efficient transmission to the wearer of light originating from a scene.

In addition, some types of holographic mirrors are passive, but other types of holographic mirrors are activable. Generally, activation of an activable holographic mirror may be performed electrically, optically, mechanically or by another method. A change of function or characteristics, in terms of angle or aperture for instance, or a deactivation of the component is possible with the use, for instance, of active photopolymers or of liquid crystals such as H-PDLC (holographic polymer dispersed liquid crystals), as described for example in WO2017005608 A1. An optically activable holographic mirror has a predetermined dioptric function, in reflection, when illuminated by light within a specific, narrow, wavelength range, such as light emitted by a dedicated light source, but is non-activated as long as it is not illuminated by light within such specific wavelength range. A resulting advantage of an activable holographic mirror is that when non-activated, its presence within the optical element is non-distinguishable for the wearer.

In an example, as actually illustrated on FIG. 12, the optical element may be a spectacle lens intended to cooperate with one or more switchable light sources (92), arranged in the vicinity of the optical element (36), for activating one or more of the holographic mirrors whenever desired. The one or more switchable light sources may for instance be embedded in a temple part of a spectacle frame.

Incoming light (90) from a switchable light source (92) is scattered and reflected by at least one holographic mirror into a corresponding beam of reflected light (93) directed towards the eye of the wearer.

The optical function of a given holographic mirror, once activated, depends on the sought aim.

For example, the aim to reflect and focus the light coming from the light source embedded in the temple of the frame towards the retina of a myopic wearer may be achieved by an off-axis curved holographic mirror with a positive optical power determined according to the prescription of the wearer.

Alternately, it may be desired to lighten the eye of the wearer with a defocused image in front of the retina, or with non-focused light.

The aim to simply lighten the eye of the wearer may be achieved by an off-axis curved mirror with a less positive optical power, or with a negative optical power, or by a plane off-axis mirror.

One or more of the holographic mirrors may further be diffusive, in other words be holographic diffusive elements having, in reflection, diffusive properties resulting from spatial variations of refractive index of said holographic diffusive element, said spatial variation of refractive index being greater than 0.001 at at least one given wavelength, on a distance less than 30 µm The arrangement of the holographic mirrors may be random, or according to a regular pattern, such as squared, hexagonal, circular and so on.

Figure 13A:
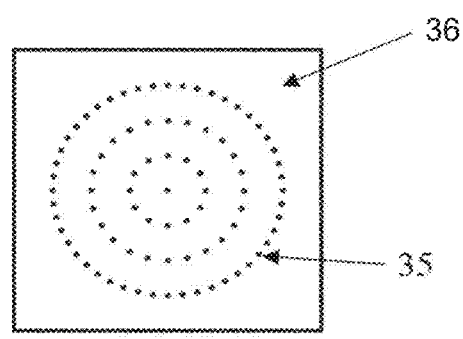
FIGS. 13A, 13B, 13C, 13D and 13E each depicts a different possible exemplary arrangement of holographic mirrors within an optical element.

FIG. 13A depicts an optical element (36) exhibiting a circular pattern comprising concentric rings. Each ring comprises a plurality of neighboring, or contiguous, areas. Over the center of each such area extends a corresponding holographic mirror (35), marked as a dot on FIG. 13A.

Figure 13B:
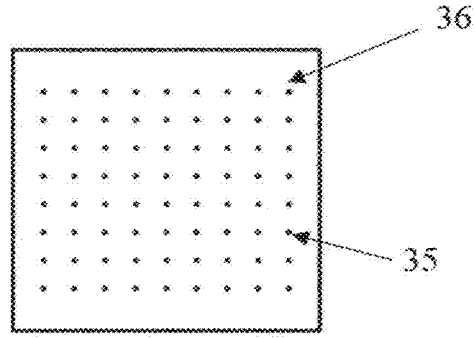

FIG. 13B depicts an optical element (36) exhibiting a squared pattern, here an upright square lattice. The vertices of the squares are each associated to a single corresponding area surrounding said vertice. Over each such area extends a corresponding holographic mirror (35) marked as a dot on FIG. 13B.

Figure 13C:
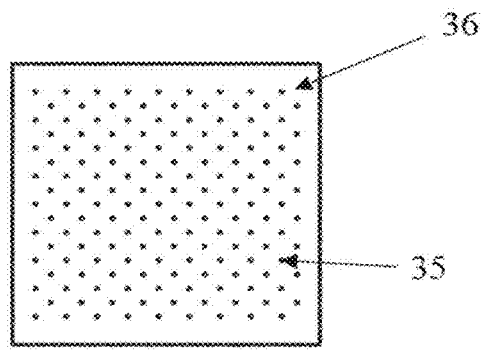

FIG. 13C which also depicts an optical element (36) exhibiting a squared pattern, here a diagonal, or centered, square lattice. The centers of the squares are each associated to a single corresponding area surrounding said vertice. Over each such area extends a corresponding holographic mirror (35) marked as a dot on FIG. 13C.

Figure 13D:
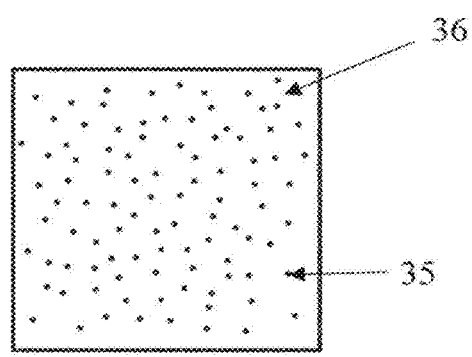

FIG. 13D depicts an optical element (36) exhibiting a random pattern. Areas are arranged without following any form of ordered lattice. Over each such area extends a corresponding holographic mirror (35) marked as a dot on FIG. 13D.

The areas may be of similar size or of different sizes. The holographic mirrors may also have different properties, for example regarding their spectral properties, their angle of diffusion, their central direction of diffusion, etc.

Figure 13E:
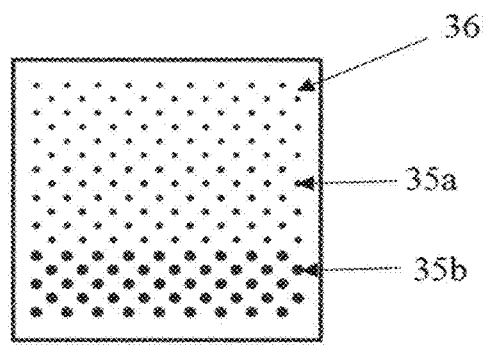

For example, FIG. 13E depicts an optical element (36) exhibiting a squared pattern resembling for the most part to that of FIG. 13C, with the difference that in FIG. 13E, a first group of areas is formed of first areas having a first size while a second group of areas is formed of second areas having a second size. Over each first area extends a corresponding first holographic mirror (35a) of the first size, while over each second area extends a corresponding second holographic mirror (35b) of the second size.

Therefore, the pattern may be composed of holographic mirrors either all having the same size or having different sizes.

In an example, the holographic mirrors may all provide the same optical function and collectively build a desired wavefront on a designated plane corresponding for example to a portion of the retina of the wearer.

On the contrary, at least two of the holographic mirrors of the optical element may have different characteristics, in other words may provide different optical functions. This differentiation allows accounting for a particular shape of the retina of a specific wearer.

Further, the arrangement of the holographic mirrors may be such that two or more holographic mirrors are contiguous, forming a cluster. For example, with a circular pattern with concentric rings formed of contiguous areas, the holographic mirrors may be the same size as the corresponding areas, thus be contiguous.

It is even possible for each holographic mirror to be contiguous to at least one other holographic mirror. This may be the case in squared patterns such as in FIG. 13B, where each dot, thus each holographic mirror, has four neighbors, or in hexagonal patterns, where each dot, thus each holographic mirror, has six neighbors.

On the contrary, the holographic mirrors may each be isolated, in other words non-contiguous.

In such case, the optical element may be conceptually divided in two types of areas defined as following:
  every holographic mirror extends over a respective area of the first type,
  while no holographic mirror extends over any area of the second type, while no area of the first type is contiguous to another area of the first type.

Since, when activated, each holographic mirror reflects a beam of light towards the eye of the wearer, the plurality of holographic mirrors collectively reflect a plurality of beams of light, so that a resulting wavefront is built. The resulting wavefront may be computed based on the recorded optical function of each holographic mirror and based on the positions of the holographic mirrors, i.e. their arrangement within the optical element.

The same computations may be performed in the reverse order. For instance, it may be desired to build a specific, wanted wavefront at a specific position, for example on, behind or in front of the retina of the wearer. The corresponding optimal arrangement of holographic mirrors each having a known dioptric function may be computed using such wanted wavefront and wanted associated position as inputs.

The recorded optical function of a given holographic mirror, or of the plurality of holographic mirrors, may further contain an image, like a cross for example, so that when the holographic mirrors are activated, said image is formed at the wanted position, by reflection and optionally by diffusion if the holographic mirror is also a holographic diffuser.

The desired characteristics of a given holographic mirror are linked to:
  parameters related to the wearer, such as prescription and other eye-related parameters
  parameters related to the spectacle frame on which the optical element is to be mounted, such as dimensions and angles.

These desired characteristics of a given holographic mirror serve as basis to determine the characteristics of the recording setup for recording this given holographic mirror.

As already explained, a holographic recording setup is built to expose a substrate to, at least, an object beam corresponding to the object to record and a reference beam, corresponding to the second part of the optical function.

The various types of holographic setups already described may all be used to record holographic diffusive mirrors:
  a mechanically-made diffuser (33) may be arranged next to a mirror (331) as shown in FIGS. 15B and 16A,
  a diffuser (33) made with computer generated hologram (CGH) technologies may be combined with a mirror,
  an amplitude and/or phase spatial light modulator (SLM) may be controlled as needed to generate modulated light that is directly useable to record any kind of holographic diffuser, including a holographic diffusive mirror
  a reference beam and an object beam, separately provided from the same source as two counter propagating beams, as shown in FIGS. 15C and 16B, may be both directed towards the area of interest, the object beam being formed of light scattered by a mechanically-made diffuser, or of light shaped by a diffuser made with CGH technologies, or of light modulated by a SLM.

In addition, it is possible to place a diffusive object (mechanical, or master hologram, or SLM in transmission) in front of a deformable mirror (DMD, DLP, and so on).

All these programmable devices each allow to record a holographic diffusive mirror that can be personalized.

All these diffusive objects may also contain at least parts of the characteristics of the resulting recorded diffuser, like deflection angle, angular selectivity, shape, grain, focalisation effect, and so on.

FIG. 11 presents an example of holographic recording setup which is applicable to record an off-axis curved diffusive mirror on a spectacle lens. As already mentioned, an off-axis curved diffusive mirror is suitable to scatter light coming from a light source arranged in the temple of a spectacle frame towards a specific position, for example on a retina of a myopic wearer.

To record different holographic mirrors on different areas of the spectacle lens, as shown in FIG. 14, the reference beam may be designed thanks to an optics like lens array, preferentially an active component like SLM, DMD or DLP to build a made-to-measure wavefront, or a passive made-to-measure optics when the design is fixed. The characteristics of the holographic mirrors may take into account the prescription of the wearer.

Although the holographic recording setups represented in FIGS. 11 and 14 both depict recording holographic mirrors directly on a spectacle lens, it is not required neither for the substrate to be a spectacle lens nor to have any specific shape. For example, the holographic mirrors may be recorded on a prescription lens, on a plano lens, or on a patch that may be applied onto a prescription or plano lens to form a compound optical element such as a spectacle lens.

In yet another embodiment, optical elements may address the recent concern of providing a different apparent color for a wearer and for an observer.

Indeed, aesthetically it may be interesting to have a lens with a clear colored signature, without however influencing the color perception of the wearer.

A possibility is to provide a lens coating that has a high reflection for a wavelength, but which does not have incidence on the wearer's vision. One way to do that is to use classical, mechanically-made narrow band mirrors, for example mechanically-made thin layers which optical properties are that of a narrow band mirror. However, a drawback of mechanically-made mirrors, including mechanically-made thin layers, is that the complementary narrow band filter may present a colored transmission.

As explained in EP 21305404.2, this drawback may be overcome by not using narrow band mirrors, but instead by using the combined influence of dyes and of the skin albedo.

The inventors have determined another solution to this concern in the use, as an alternative technology, of holographic diffusive mirrors which optical function is carefully selected for the purpose of disconnecting the color of a lens as perceived by an observer from the color perception of the wearer.

Reflection by holographic mirrors is classically specular with a low angular acceptance and colors changing with the direction of reflection. Aesthetically, this last point has an interest since it allows providing a rainbow reflection for the observer.

Reflection by holographic diffusive mirrors also usually has a low angular acceptance, but solutions and corresponding recording setups are proposed hereafter to increase this angular acceptance as much as possible.

The common point of these solutions is to record a narrow band diffusive hologram on one side of the substrate, preferably the object side, which is the side opposite to the wearer when worn. By tuning the recording wavelength, it is possible to select a specific narrow band within a large spectrum (including for example blue, green and yellow).

As a result, the resulting holographic diffusive mirror reflects the input ambient light with a diffuse reflection.

The efficiency of this diffuse reflection is high enough to be visible to an observer at any intensity level of ambient light.

Due to the narrow band, the diffuse reflection is colored, with the color being strongly saturated.

The diffusive holographic mirror has a diffusive reflection and a filtering transmission. The diffuser is not visible in transmission by the wearer. Contrarily to the case of specular reflection, the inventors have noticed that the spectrum of the light transmitted by such holographic diffusive mirrors does not exhibit a high filtering efficiency. In other words, such a holographic diffusive mirror only slightly affects the color perception in transmission, that is to say through the substrate. As a consequence, the wearer of an optical lens comprising one or more such holographic diffusive mirrors does not have the impression to be wearing a colored lens.

Apart from disconnecting the apparent color of an optical lens in reflection and in transmission, other applications are interesting, like providing an aesthetic filter to mask, or conceal, any inaesthetic aspects of lenses, like microstructures for myopia control, or like recently developed types of optical functions, like structures for ARE or focusable lenses for example. Of course the wavelength filtered by the diffusive holographic mirror should be different from the wavelength of interest of the element to be concealed.

It may further be interesting to dissimulate the natural color of a filter that can be considered as inaesthetic, like filters for color-blind wearers. To do so, an additional function of filtering light in transmission may be added to the holographic diffusive mirror. For example, some holographic mirrors may behave as blue-cut filters in the 460-510 nm or 440-520 nm bandwidths, or as yellow-cut filters in the 560-660 nm bandwidth.

FIG. 15A shows the principle of a setup that may be used to record holographic mirrors and FIG. 15B the principle of a setup that may be used to record a holographic diffusive mirror. The recorded object is mainly a reflective object but it may have a specific, chosen, optical function also in transmission.

In FIG. 15A a reference beam (30) is directed towards a mirror (331). The reference beam and the resulting reflected beam both illuminate the holographic plate (32), forming an interference pattern for recording the holographic mirror.

In FIG. 15B a reference beam (30) is directed towards a combination of a diffusive object (33) and of a mirror (331). The resulting object beam (31), as well as the reference beam (30) both illuminate the holographic plate (32), forming an interference pattern for recording the holographic diffusive mirror.

The holographic setup shown in FIG. 16A follows the principle, depicted in FIG. 15B, to build a plane diffusive mirror on a holographic plate. A single beam may be transmitted through a polarization maintaining fiber (42). Such beam illuminates, as a reference beam (30), the holographic plate (32). After being reflected by a mirror (331) and being transmitted by a diffusive object (33), such beam further illuminates, as an object beam (31), the holographic plate (32).

The combination of the reference beam and of the object beam allow recording a plane diffusive holographic mirror.

Such diffusive mirror is preferably monochromatic. It reflects and diffuses only the range of the visible spectrum corresponding to the spectral selectivity of the holographic material.

The reflected and diffused wavelength and bandwidth are defined by the recording laser(s) wavelength(s), the recording setup and the used photosensitive material.

In embodiments where the aim is to provide a lens having a different apparent color for an observer and for a wearer, the relevant spectrum is visible light, therefore visible lasers are used. Wavelengths are thus comprised between 350 nm and 750 nm.

It is for example possible, with a given type of photopolymer, to record objects able to diffusively reflect light in a narrow band chosen in a larger wavelength band spanning from blue to yellow. Another type of photopolymer may allow to record objects able to diffusively reflect light in a narrow band corresponding to a red wavelength.

The reflected bandwidth is mainly comprised between 5 and 15 nm.

Experimental results have shown that the efficiency of reflection of a diffusive holographic mirror can be as high as 95%, at least.

The substrate is transparent on the rest of the visible range, with a transparency of about 90%, limited by Fresnel reflections and by the intrinsic transmission of the substrate.

The roughness of the holographic coating after exposition is typically comprised between 0.05 and 0.5 μm, for a homogenously deposited coating.

Various modifications of the holographic setups depicted on FIGS. 16A and 16B are possible.

For example, a picture can be kept clear of diffusing mirror on the lens and the diffused reflection let appear this picture when the observer looks at the lens. The picture can thus not be colored, or can be a mirror and have the same color as the diffuser, but it will be more visible for the observer.

For example, a plurality of diffusive mirrors can be recorded for a plurality of different wavelengths to have different diffused reflections for two different observer's points of view.

Rainbow diffusive mirrors may be obtained using a single recording wavelength. To explain the influence of holographic mirrors on the color perception by an observer, it is hereafter referred to FIG. 18, which depicts the diffusion of light from a scene by an optical element comprising a plurality of identical narrow band diffusive holographic mirrors extending over different areas, or—equivalently—by an optical element comprising a single narrow band diffusive holographic mirror, extending over a whole main surface of the optical element and having substantially uniform optical properties.

A first incident ray (180) is depicted as being directed towards one such diffusive mirror (35). The first incident ray is ambient light spanning across a wide wavelength range including the narrow band associated to the diffusive mirror. Due to the diffusive reflective properties of such mirror, the first incident ray is reflected as a first group of reflected rays (181) with multiple respective angles of reflection around a first central angular direction (not represented).

The same applies for a second incident ray (183), which also corresponds to ambient light and which is reflected by another identical holographic diffusive mirror as a second group of reflected rays (184) around a second central angular direction (not represented).

From the perspective of an eye of an observer, depicted on the left of FIG. 18, diffuse light is provided by both holographic mirrors (35), but with different levels. The amount of light coming to the observer from the first group of reflected rays (181) is smaller than that from the second group of reflected rays (184).

Considering for example the narrow band as being green light, this means that the observer does not perceive the same amount of green light from both holographic mirrors (or in the case of a single holographic mirror covering the whole optical element, from both parts of the holographic diffusive mirror), therefore, their respective color, as perceived by the observer, is different.

Multicolored diffusive mirrors may be obtained by recording different reflective diffusers, using different recording wavelengths, on different areas of the lens.

Figure 19:
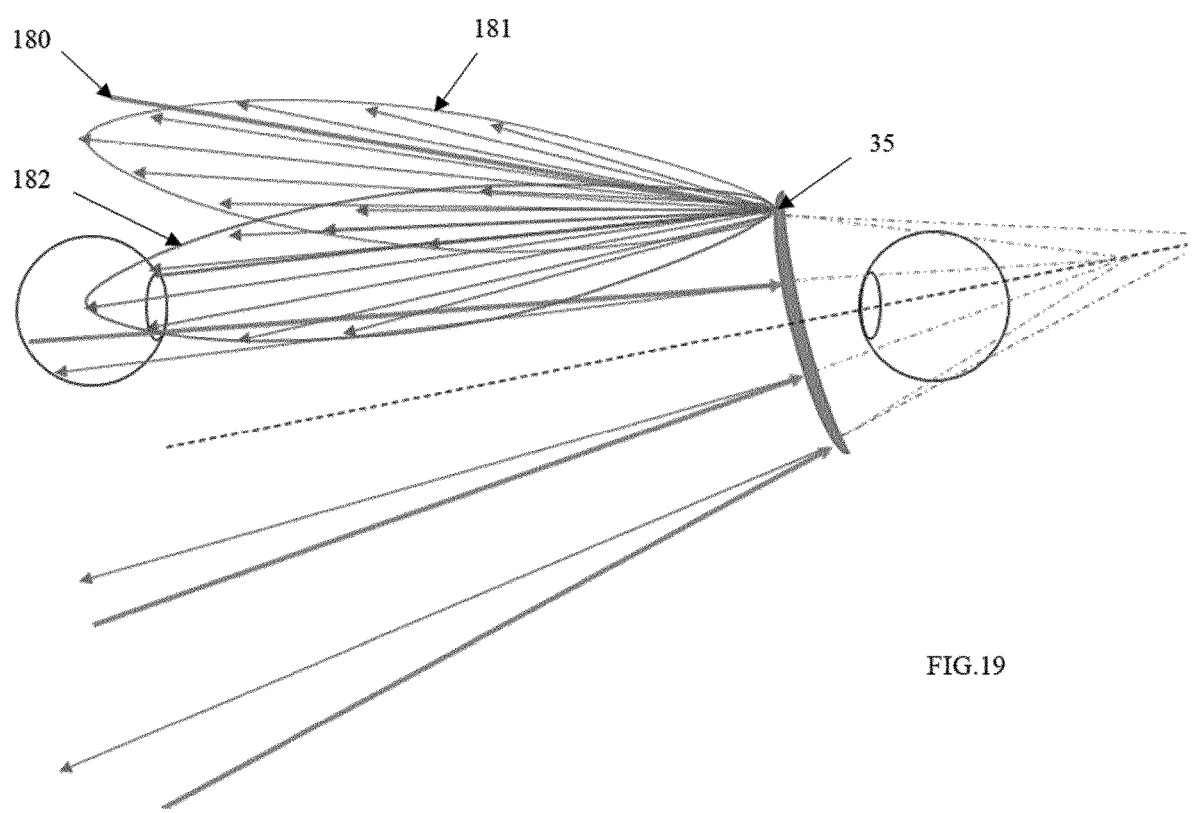
FIG. 19 depicts the diffusion of light from a scene by an optical element comprising two diffusive holographic mirrors, both having been recorded according to the setup of FIG. 17F.

As an illustration, FIG. 19 depicts the diffusion of light from a scene by an optical element comprising two different narrow band diffusive holographic mirrors extending across the same area.

For example, one of said mirrors diffusively reflects green light while the other diffusively reflects orange light. Considering the same incident ray of light (180) as depicted on FIG. 18, two groups of reflected rays (181, 182) are obtained, one corresponding to green wavelengths, the other corresponding to orange wavelengths. As a result, depending on the position of the observer, the color of the area of the lens where both diffusive holographic mirrors are located appears different, spanning from green to orange in this example.

With the setup of FIG. 16A, the resulting recorded diffusive mirror has a low angular acceptance. The colored diffusion is visible for the observer with an angle closed to +/−10° around the normal of the lens surface.

Improvements of the setup to increase the field of diffusive mirrors are possible with managements of the object beam and the reference beam.

FIGS. 17A-17F show different possibilities of such recording setups, with convergent reference beams (30). These setups may also be converted to divergent beams. FIGS. 17A-17F are just illustrations of possibilities of setups. For example, there is no restriction on the color of the laser source (40). First demonstrations have already been made with green sources. The scales are obviously not respected for clarity of the figures.

The different components presented in these setups can obviously be combined to form another setup.

The holographic plate (32) is mainly in normal incidence with the reference beam (30) but can be oriented in order to change the direction of the reflection or the reflected main wavelength.

Figure 17A:
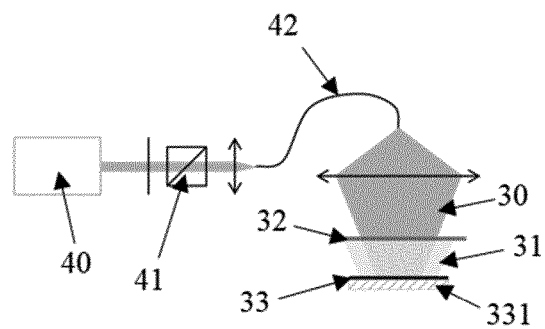

FIG. 17A depicts a holographic setup with a plane mirror (331) and a plane diffuser (33).

Figure 17B:
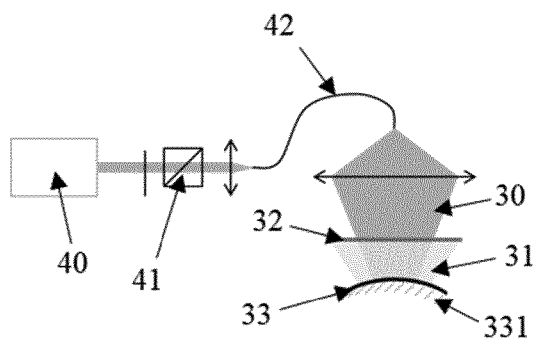

FIG. 17B depicts a holographic setup with a curved mirror (331) and a curved diffuser (33).

Figure 17C:
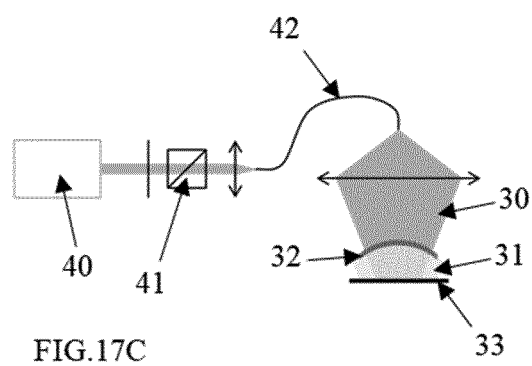

FIG. 17C depicts a holographic setup with a reflective SLM that is used as a programmable diffuser (33) and reflector (331).

Figure 17D:
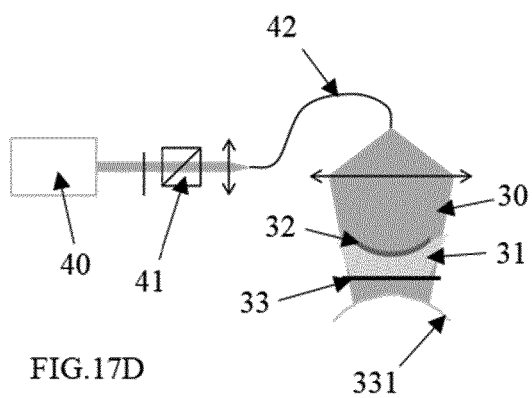

FIG. 17D depicts a holographic setup with an adaptive mirror used as a programmable reflector (331) and a transmission SLM used as a programmable diffuser (33).

FIG. 17E depicts a holographic setup with annular lightning for the object beam (31).

FIG. 17F depicts a holographic setup with mobile lightning as the object beam (31).

The embodiment of FIG. 17F is particularly useful since it allows recording a plurality of different holographic mirrors on different areas of the lens, with different orientations of the object beam (31).

A possibility is to tune the orientation of the object beam so as to record holographic mirrors all exhibiting the same level of reflected light in a given angular direction. As a result, an observer located in said given angular direction has a uniform perception of the color of the optical element on which the holographic diffusive mirrors are reflected.

Another specific recording configuration based on the general setup depicted on FIG. 17F may be used so that for the wearer, the light intensity reaching the eye is globally constant whatever is the gaze direction. For this configuration, a possibility is to shape the reference beam to have a focus close to the angular direction corresponding to the eye rotation center of the wearer.

The different setups shown on FIGS. 4, 6, 11, 14, 16A, 16B and 17A-17F are based on polarization-maintaining optical fibres (42) and lenses to manage the shape of the reference beam (30). The focusing lens can be a combination of lenses to increase the field of the reference beam, like a fisheye lens. It is possible to suppress the fibres and have the beam in free space, like in classical holographic setups. It is also possible to shape the reference beam (30) with reflective optics instead of lenses.

The SLM and adaptive mirrors presented in FIGS. 17C and 17D are configured to shape the reflected diffuse beam, or object beam (31). It is obviously possible to use such programmable devices to shape the reference beam (30) instead, or to shape both the reference beam and the object beam.

Similarly, the annular optics depicted in FIG. 17E could be used to shape indifferently the reference beam (30) and/or the object beam (31). In this case, the recording of the diffusive mirror may be made by areas or not. A large field of light may thus be built with large optics and with annular optics.

To obtain a large field of diffuse reflection, it is also possible to record the function by parts. To do so, the holographic plate (32) is mounted on a mobile mount with angular displacements or on a hexapod for example. Different areas may thus be recorded. If the holographic material is reactive enough, it is possible to record the areas quickly, in a few seconds, for example 2 s. It is thus possible to change the orientation gradually in a smooth movement, and/or to use pulsed lasers, like millisecond or nanosecond lasers, for recording holographic diffuse mirrors.

The reference beam shape and size depend mainly on the desired angular acceptance, in terms of a desired angular range of points of view for an observer to see the diffusive mirror.

For the object beam, the mirror (331) behind the diffuser (33) may be a plane mirror as depicted on FIG. 17A or a curved mirror as depicted on FIG. 17B, with a curvature calculated to cover a large field of vision. The diffuser (33) itself may be curved too, mainly if the mirror (331) is curved as well, to cover the large field of view of the mirror.

On the side of the reference beam, if the beam is a collimated beam, the diffusive mirror will be visible by an observer in front of the wearer. To increase the angle of visibility of the diffused color, the reference beam has to be convergent on a point behind the mirror, or divergent in front of the substrate and reflected thanks to a curved mirror.

Different directions of recording may also be used to open the field of view. For example, two divergent beams may be used to create a curved mirror, and a diffuser may be added on the object beam to obtain the diffusion effect. With this setup, the colored diffusion can be visible with an angle of about 45° (+/−22° around the normal of the lens surface). A diffuser may also be placed on the path of the reference beam to make it diverge.

Setups that use only one beam and the reflection on a mirror for the object beam are the preferred solutions for transparent lenses. For solar or tinted lenses, it is preferable to use setups with a beam as reference beam and at least a second one as an object beam.

The invention claimed is:

1. An optical element configured to be worn in front of an eye of a wearer, the optical element having two main surfaces,
   wherein the optical element comprises at least one holographic diffusive element having diffusive properties resulting from spatial variations of refractive index of said holographic diffusive element, said spatial variation of refractive index being greater than 0.001 at at least one given wavelength, on a distance less than 30 µm.

2. The optical element according to claim 1, wherein the two main surfaces are configured so that a refractive power based on a prescription for the eye of the wearer is provided.

3. The optical element according to claim 1, wherein the at least one holographic diffusive element extends over only part of one of the two main surfaces or over an entirety of one of the two main surfaces.

4. The optical element according to claim 1, wherein the at least one holographic diffusive element is a holographic gradient diffusive element, the holographic gradient diffusive element having a diffusion efficiency which increases from a center of the holographic diffusive element to a periphery of the holographic diffusive element.

5. The optical element according to claim 1, wherein the at least one holographic diffusive element has a diffusion efficiency between 5 and 50% at the at least one given wavelength within a predetermined range.

6. The optical element according to claim 1, the spatial variations of refractive index being configured such that:
   for at least one angular direction of incidence, when the optical element is exposed to a source beam of light originating from said angular direction of incidence, the source beam of light is scattered by at least one holographic diffusive element, forming at least one beam of scattered light,
     each said beam of scattered light being centered on a respective central angular direction, defined as an angular direction exhibiting a maximum luminance value, and
     each said beam of scattered light exhibiting a respective angle of diffusion, defined as a full width at half maximum of luminance, which has a wanted value comprised between 2° and 40° according at least one direction.

7. The optical element according to claim 1, wherein said spatial variations of refractive index are configured so that the at least one holographic diffusive element has an optical function of scattering light to illuminate a retina of said eye so as to slow down a progression of an abnormal refraction of the eye.

8. The optical element according to claim 1, wherein the at least one holographic diffusive element is a holographic diffusive mirror.

9. The optical element according to claim 8, wherein the at least one holographic diffusive element has a diffusion efficiency between 1 and 5% at the at least one given wavelength within a predetermined range.

10. An optical equipment configured to be worn in front of a wearer eye, comprising:
    an optical element wherein the optical element comprises at least one holographic diffusive element having diffusive properties resulting from spatial variations of refractive index of said holographic diffusive element, said spatial variation of refractive index being greater than 0.001 at at least one given wavelength, on a distance less than 30 µm; and
    a light source arranged to light at the at least one given wavelength on the at least one optical element.

11. The optical equipment according to claim 10, further comprising a motion sensor configured to acquire a signal as function of a motion of the wearer, wherein the light source is lit on when the acquired signal has a predetermined value.

12. A method for recording a holographic medium onto an optical lens, the method comprising:
    providing an unrecorded optical lens comprising a recording medium extending over an area of interest, the unrecorded optical lens having two main surfaces;
    providing a diffusive object; and
    recording a holographic diffusive element on the recording medium by simultaneously illuminating the area of interest with:
      a reference beam being a beam of coherent light, and
      an object beam being a beam of coherent light scattered through the diffusive object to obtain a recorded optical lens,
    wherein the diffusive object, the reference beam and the object beam are configured so that the recorded holographic diffusive element has diffusive properties resulting from spatial variations of refractive index of said holographic diffusive element, said spatial variation of refractive index being greater than 0.001 at at least one given wavelength, on a distance less than 30 µm.

13. The method according to claim 12, wherein, while recording the holographic diffusive element, the reference beam and the object beam form two separate beams that are respectively directed towards opposite main surfaces of the unrecorded optical lens.

14. A method for recording a holographic medium onto an optical lens, the method comprising:
    providing an unrecorded optical lens comprising a recording medium extending over an area of interest, the unrecorded optical lens having two main surfaces;
    modelling optical properties of a diffusive object; and
    recording a holographic diffusive element on the recording medium by simultaneously illuminating the area of interest with:
      a reference beam being a beam of coherent light, and
      an object beam simulating a beam of coherent light which would be scattered by the diffusive object to obtain a recorded optical lens, wherein the diffusive object, the reference beam and the object beam are configured so that the recorded holographic diffusive element has diffusive properties resulting from spatial variations of refractive index of said holographic diffusive element, said spatial variation of refractive index being greater than 0.001 at at least one given wavelength, on a distance less than 30 µm.

15. The method according to claim 14, wherein, while recording the holographic diffusive element,
the reference beam is provided by a source; and
the object beam is provided by a spatial light modulator used as a programmable diffuser and reflector, the reference beam being directed towards a first one of the two main surfaces and the object beam being directed towards a second one of the two main surfaces.

* * * * *